US011254323B2

(12) United States Patent
Adams et al.

(10) Patent No.: US 11,254,323 B2
(45) Date of Patent: Feb. 22, 2022

(54) LOCALIZATION ERROR MONITORING

(71) Applicant: Zoox, Inc., Foster City, CA (US)

(72) Inventors: Derek Adams, Santa Clara, CA (US);
David Burdick Berman, San Mateo, CA (US); Michael Carsten Bosse, Cupertino, CA (US); Guillermo Duenas Arana, Chicago, IL (US); Anne-Claire Elisabeth Marie Le Hénaff, San Francisco, CA (US); Francesco Papi, Sunnyvale, CA (US); Brice Rebsamen, San Jose, CA (US)

(73) Assignee: Zoox, Inc., Foster City, CA (US)

( * ) Notice: Subject to any disclaimer, the term of this patent is extended or adjusted under 35 U.S.C. 154(b) by 78 days.

(21) Appl. No.: 16/809,400

(22) Filed: Mar. 4, 2020

(65) Prior Publication Data
US 2021/0276577 A1 Sep. 9, 2021

(51) Int. Cl.
| | | |
|---|---|---|
| *B60W 50/00* | (2006.01) | |
| *B60W 50/02* | (2012.01) | |
| *B60W 50/038* | (2012.01) | |
| *B60W 50/04* | (2006.01) | |
| *B60W 40/10* | (2012.01) | |

(Continued)

(52) U.S. Cl.
CPC ........ *B60W 50/0205* (2013.01); *B60W 40/06* (2013.01); *B60W 40/10* (2013.01); *B60W 50/038* (2013.01); *B60W 50/045* (2013.01); *G05D 1/0088* (2013.01); *B60W 2050/021* (2013.01); *B60W 2050/046* (2013.01); *B60W 2520/06* (2013.01); *G05D 2201/0213* (2013.01)

(58) Field of Classification Search
USPC .................. 701/23–28, 29.1–34.4
See application file for complete search history.

(56) References Cited

U.S. PATENT DOCUMENTS

| | | | |
|---|---|---|---|
| 10,423,934 B1* | 9/2019 | Zanghi | G05D 1/0225 |
| 10,589,785 B2* | 3/2020 | Kim | B62D 15/025 |
| 2019/0106117 A1* | 4/2019 | Goldberg | G06F 11/00 |

(Continued)

FOREIGN PATENT DOCUMENTS

| | | |
|---|---|---|
| WO | WO2019033025 A1 | 2/2019 |
| WO | WO2020014090 A1 | 1/2020 |

OTHER PUBLICATIONS

The PCT Search Report and Written Opinion dated May 20, 2021 for PCT Application No. PCT/US21/17208, 10 pages.

*Primary Examiner* — Jonathan L Sample
(74) *Attorney, Agent, or Firm* — Lee & Hayes, P.C.

(57) ABSTRACT

Localization error monitoring using vehicle state information is described. A computing system associated with a vehicle may determine a current state of the vehicle, such as a location, position, orientation, velocity, acceleration, or the like. The vehicle computing system may determine one or more metrics associated with the state of the vehicle. The metrics may include a variance associated with the state, a residual associated with a measurement corresponding to the state, or a correction factor applied to correct an input error. The computing system may determine whether the metric exceeds a threshold value. Based on a threshold exceedance, the computing system may determine one or more errors associated with a state of the vehicle. The vehicle computing system may control the vehicle based on the one or more errors.

20 Claims, 7 Drawing Sheets

(51) Int. Cl.
*G05D 1/00* (2006.01)
*B60W 40/06* (2012.01)

(56) References Cited

U.S. PATENT DOCUMENTS

| | | | | |
|---|---|---|---|---|
| 2019/0145765 | A1* | 5/2019 | Luo | G06K 9/00791 |
| | | | | 702/153 |
| 2019/0186920 | A1* | 6/2019 | Leach | G01C 25/005 |
| 2019/0212725 | A1* | 7/2019 | Woodrow | G05D 1/0011 |
| 2019/0225233 | A1* | 7/2019 | Tod | G06Q 50/30 |
| 2019/0258251 | A1* | 8/2019 | Ditty | G06K 9/00805 |
| 2019/0324458 | A1* | 10/2019 | Sadeghi | G05D 1/0088 |
| 2020/0003897 | A1* | 1/2020 | Shroff | G01S 17/86 |
| 2020/0003901 | A1* | 1/2020 | Shroff | G01C 21/32 |
| 2020/0097772 | A1* | 3/2020 | Nakanishi | G06N 3/084 |
| 2020/0134494 | A1* | 4/2020 | Venkatadri | G06N 5/048 |
| 2020/0192396 | A1* | 6/2020 | Lee | G01S 17/931 |
| 2020/0201324 | A1* | 6/2020 | Darayan | G05D 1/0238 |
| 2020/0211394 | A1* | 7/2020 | King | G05D 1/0077 |
| 2020/0264275 | A1* | 8/2020 | Voorheis | G01S 7/497 |
| 2020/0372263 | A1* | 11/2020 | Song | G05D 1/0278 |
| 2020/0394813 | A1* | 12/2020 | Theverapperuma | E02F 3/437 |
| 2021/0116915 | A1* | 4/2021 | Jiang | G08G 1/096827 |
| 2021/0192841 | A1* | 6/2021 | Hu | G01S 13/89 |
| 2021/0215485 | A1* | 7/2021 | Ishigami | G01S 19/33 |

* cited by examiner

LOCALIZATION ERROR MONITORING

BACKGROUND

Localization is the process by which an entity determines its location in its environment. That is, by localizing itself, an entity, such as a vehicle, can determine its precise relationship to elements on a map associated with the environment within which the entity is positioned. When used in robotic applications, such as autonomous vehicles, errors in localization can cause undesirable events.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
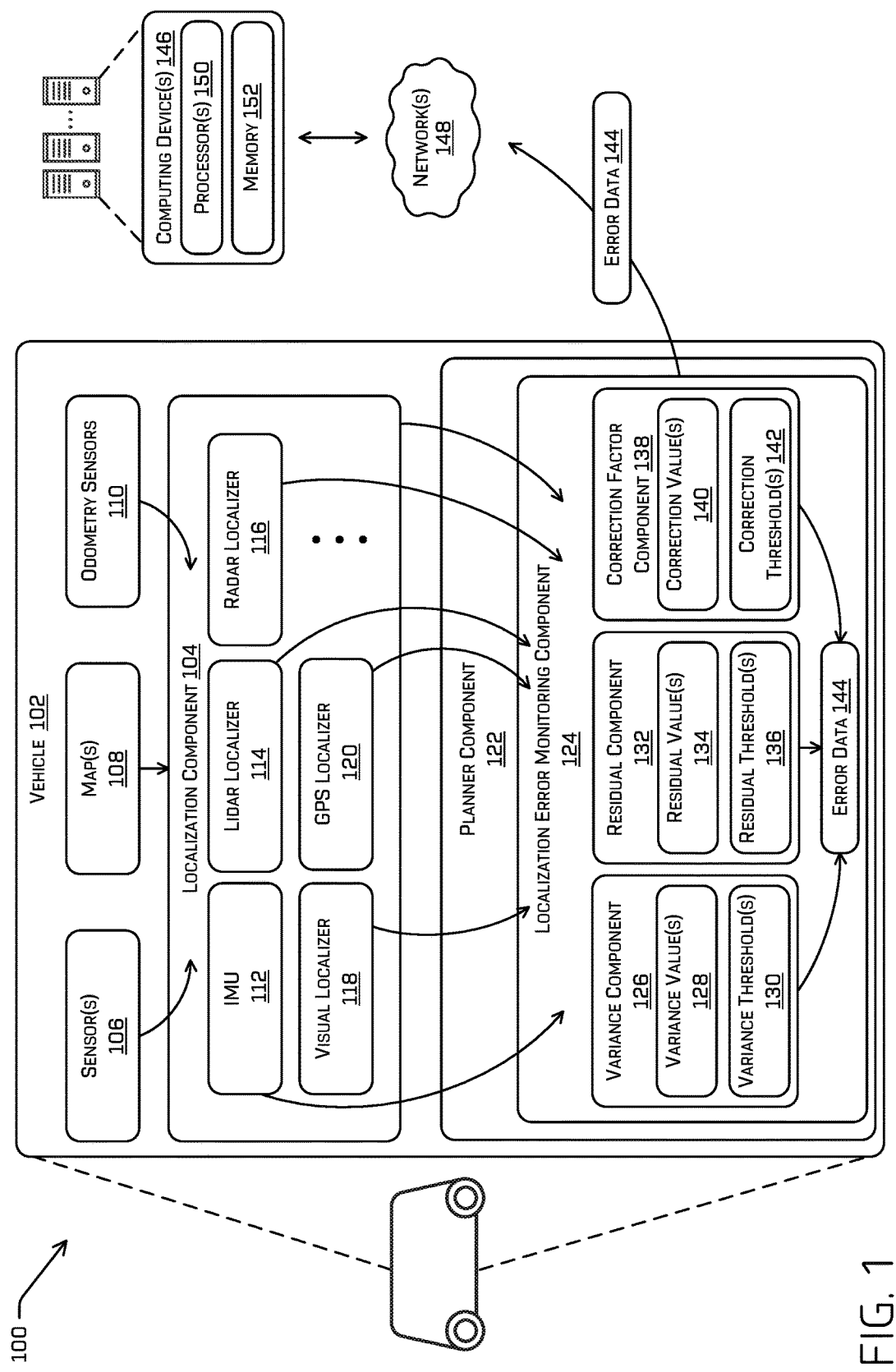
FIG. 1 illustrates a block diagram of an example localization error monitoring system, as described herein.

Techniques described herein relate to monitoring localization errors associated with an entity, such as a vehicle. A vehicle computing system of a vehicle may determine a current state of the vehicle. The state of the vehicle may include one or more of a location, position, orientation, velocity, acceleration, or the like. In some examples, the state may include a state of the vehicle itself. In some examples, the state may include a state of a component of the vehicle (e.g., a wheel speed, wheel orientation, etc.). The vehicle computing system may determine one or more nominal errors and/or one or more unmodeled errors associated with the state of the vehicle. The vehicle computing system may control the vehicle based on the nominal error(s) and/or the unmodeled error(s).

The vehicle may include an autonomous or semi-autonomous vehicle that utilizes sensor data collected by one or more sensors to navigate through an environment. The sensor data captured by the vehicle may include data captured by lidar sensors, camera sensors, radar sensors, time-of-flight sensors, sonar sensors, inertial measurement units (IMU), and the like. In various examples, the vehicle computing system may additionally navigate through the environment based on map data associated with one or more maps. The map(s) may include feature maps (e.g., discrete features associated with the environment), tile maps (e.g., environment represented in discrete regions of data), and the like. In some examples, the vehicle computing system may utilize map(s) as described in U.S. patent application Ser. No. 16/022,048, filed Jun. 28, 2018 and entitled "Multi-Resolution Maps for Localization," U.S. patent application Ser. No. 16/022,106, filed Jun. 28, 2018 and entitled "Loading Multi-Resolution Maps for Localization, and U.S. patent application Ser. No. 16/147,158, filed Sep. 28, 2018 and entitled "Condition Dependent Parameters for Large-Scale Localization and/or Mapping," and U.S. patent application Ser. No. 16/722,598 filed Dec. 20, 2019 and entitled "Maps Comprising Covariances in Multi-Resolution Voxels," the entire contents of each are incorporated herein by reference.

In various examples, the vehicle computing system may include various localizers configured to receive particular sensor data as input and to output a state of the vehicle. The localizers may include a lidar localizer, radar localizer, visual localizer, internal measurement unit (IMU) localizer, GPS localizer, and the like, including localization performed based at least in part on any one or more of the sensor modalities described in detail herein. For example, a lidar localizer may receive sensor data from one or more lidar systems and/or one or more maps associated with an environment. The lidar localizer may process the sensor data and the map(s) to determine a state of the vehicle. For another example, a visual localizer may receive sensor data from one or more cameras and one or more maps. The visual localizer may process the sensor data and the map(s) to determine a state of the vehicle. For yet another example, an IMU localizer may receive sensor data from one or more IMUs and/or one or more odometry sensors (e.g., wheel speed sensors, motor speed sensors, steering angle sensors, etc and may determine a state of the vehicle based on the sensor data.

In existing technology, vehicle computing systems do not include systems for direct measurement of errors in the vehicle state. Instead, existing systems may monitor for general inconsistencies in position and orientation of the vehicle, such as across all localization systems. Based on a determined inconsistency, the existing systems may determine to cease operation of the vehicle.

Techniques described herein relate to using metrics output by a plurality of localizers e.g., localization systems) and/or vehicle systems to determine one or more errors associated with each localizer and/or vehicle system. In various examples, localizers (e.g., lidar localizer, visual localizer, IMU localizer, etc.) may output a state of the vehicle to a localization error monitoring component. In some examples, a localization component may determine a global state of the vehicle (e.g., combined state) based on state information received from one or more of the localizers. The localization component may include a component configured to determine a location, position, orientation, velocity, and/or acceleration of the vehicle, such as that described in U.S. patent application Ser. No. 16/712,753, filed Dec. 12, 2019 and entitled "Localization Error Handling," the entire contents of which are incorporated herein by reference. In some examples, the localization component may output the global state of the vehicle and/or the state information to the localization error monitoring component.

In some examples, the localization error monitoring component may determine one or more metrics associated with the state information received from each localizer. The localization error monitoring component may determine one or more errors in the vehicle state based on the state information provided by the individual localizers and/or vehicle systems based on the metrics. The localization error monitoring component may provide the data associated with the error and the associated localizer and/or vehicle system to the planner component. The planner component may thus determine, based on the extent of the error and/or the particular localizer and/or vehicle system, an action for the vehicle to take, such as to take the localizer and/or vehicle system offline, slow down, stop operation of the vehicle, and the like. Accordingly, the techniques described herein enable the vehicle to ensure highly accurate location information by monitoring the metrics and/or enable quick and accurate error identification in a localization system based on the metrics.

The metrics may include a variance for each estimated state of the vehicle. The variance for each estimated state may include a confidence determined by the respective localizer that the estimated state is accurate. In some examples, the variances may be estimated by propagating the expected uncertainty from the inputs to the estimates using a linearized system. In some examples, the localization error monitoring component may determine a co-variance for each estimated state of the vehicle. In such examples, the localization error monitoring component may monitor variances across two or more dimensions. For example, the covariance may include a variance across longitudinal and lateral dimensions (e.g., X/Y). For another example, the covariance may include a variance across a pitch, roll, and yaw of the vehicle. In various examples, the localization error monitoring component may compare the variance and/or co-variance to a threshold. As will be discussed in greater detail below, the threshold may be determined based on an alert limit for the monitored state.

In some examples, the metrics may include one or more optimization residuals (referred to herein as residuals) associated with measurements corresponding to each estimated state of the vehicle. The residual(s) may represent a difference between an observed value (e.g., based on sensor input) and an estimated value of a quantity of interest (e.g., estimated pitch, roll, yaw, location in a coordinate system and/or dimension, velocity, etc.). In some examples, the estimated value may be based in part on a value associated with a previous time step (e.g., value associated with a measurement taken 0.1 second prior to the current measurement). In such examples, the residuals may represent inconsistencies in the measurements. For example, a residual may include a difference between an observed velocity at a time and a velocity at a previous time step. Based on determining the difference, the localization error monitoring component may determine that a system associated with the velocity measurement may be generating an error. In various examples, the localization error monitoring component may compare the residuals to pre-determined threshold residuals associated with the measurements. In such examples, based on the comparison, the localization error monitoring component may determine the extent (e.g., size) of the error.

In various examples, the localization error monitoring component may additionally compare the residuals to the associated variances and/or covariances. In such examples, the measurements associated with a state may be compared to the confidence in the state. In some examples, the residual may be normalized by the variances and/or covariances (e.g., modified to a same scale as the variance and/or covariance). In such examples, the comparison may result in a whitened residual. In some examples, the localization error monitoring component may determine the white in the residual. Based on a value associated with the white in the residual, the localization error monitoring component may determine whether the residual exceeds a threshold. In some examples, the planner component may control the vehicle based on the residual value comparison.

In various examples, the localization error monitoring component and/or the planner component may be configured to assign weights (e.g., 1.2, 1.5, etc.) to residual(s) associated with different localizers. In some examples, the weights may represent an importance of the localizer to the control of the vehicle. In some examples, the weights may be applied based on one or more environmental considerations (e.g., road conditions, time of day, level of darkness (e.g., light level), etc.) and/or weather considerations (e.g., temperature, precipitation, fog, etc.). In such examples, the localization error monitoring component and/or the planner component may be configured to dynamically adjust weights based on changing environmental and/or weather conditions, assigning different importance levels to particular localizers based on the environmental conditions. For example, during daylight hours on a sunny day, a visual localizer may be weighed higher than a lidar localizer. However, at night on a dark night, the lidar localizer may be weighed higher than the camera localizer due to a decreased visual acuity of the cameras. Such weights may be machine learned based at least in part on driving performance and/or determined using heuristics. Driving performance may include speed limitations due to reduced visual acuity based on reduced lighting, sun location, etc.

In some examples, the weights may increase the value of the residual as compared to the threshold. In such examples, based on the importance of the associated system to the control of the vehicle, the planner component may choose a more conservative action with regard to controlling the vehicle based on the residual values. For example, based on a high residual associated with one or more measurements determined by an IMU localizer, such as that resulting from a weighted residual, the planner system may determine stop forward movement of the vehicle.

In some examples, the localization error monitoring component may identify a high residual associated with a particular localizer and/or particular vehicle system (e.g., localization associated with measurement data front one or more wheels—such as wheel encoders, etc.) and may compare the high residual to another residual associated with a same or similar type of localizer and/or a same or similar type of vehicle system (e.g., redundant localizers, sensors, and/or vehicle components or systems). In such examples, the localization error monitoring component may be configured to determine whether the particular localizer and/or particular system is failing and/or is experiencing a temporary glitch, or if the sensor inputs to the par localizer and/or particular system are wrong (e.g., uncalibrated sensor). For example, a vehicle comprising four wheels may include four-wheel speed measurements. The localization error monitoring component may determine that a first wheel speed measurement includes a high residual. The localization error monitoring component may compare the single wheel to the three other wheels to determine that the first wheel includes an erroneous measurement, such as that due to a wheel slip. The localization error monitoring component and/or planner component may determine to ignore the erroneous measurement for a particular time step. In a similar example, such a system may determine that the one wheel may have a lower pressure than required (causing a discrepancy in the predicted state).

In some examples, the localization error monitoring component and/or planner component may monitor the residuals over a period of time. In such examples, based on a determination that a particular localizer and/or a particular system is outputting measurements with high residuals over a threshold period of time, the localization error monitoring component and/or planner component may determine that the particular localizer and/or particular system is out of calibration and/or should be disregard for vehicle control considerations. In some examples, the planner component may determine an action for the vehicle to take based on the particular localizer and/or the particular system and a number of other redundant localizers and/or systems. For example, an IMU localizer may receive data from four different IMU sensors. The IMU localizer may have associated therewith four residuals for measurements associated with the different IMU sensors. Based on a determination that a first sensor of the four sensors has a residual that is above a threshold value for greater than a threshold amount of time, the planner component may disregard the IMU in vehicle control considerations.

In some examples, the planner component may determine to disregard sensor inputs and/or determine actions for the vehicle to take based on measurements associated therewith based on a number of redundant systems available. In some examples, based on a determination that a threshold number of systems are operational, the planner component may continue vehicle operation. In some examples, based on a determination of an error associated with a system and an insufficient number of alternate systems available, the planner component may determine to cease vehicle operation. In such examples, the planner component may pull the vehicle over and/or stop the vehicle to ensure maximum safe operation of the vehicle.

In some examples, the planner system may maximize safe operation by determining that one or more correction factors associated with vehicle systems are within limits. In such examples, the metrics may include the correction factors. The correction factors may include IMU biases, wheel diameter scale factors, and the like. Correction factors may be used to correct for input errors that are known to follow a predefined model. In some examples, the correction factors may have associated maximum and/or minimum threshold values. In some examples, the localization error monitoring component may determine whether an applied correction factor exceeds the threshold values (e.g., at or above the maximum, at or below the minimum). For example, a radius of a wheel on a vehicle may change over a period of time of vehicle operation (e.g., due to wear, pressure/temperature changes, etc.). The change to the radius may not be calibrated prior to vehicle operation, as the exact temperatures, road conditions, etc. may not be known prior to release. A wheel scale error may include a determination of how fast the wheel is spinning as compared to how fast it should be spinning. The correction factor may account for the radius of the wheel and odometry, such as to correct for slight changes in the radius and resulting wheel speed. Based on a determination that the correction factor exceeds a maximum or minimum threshold, such as based on the radius of the wheel increasing or decreasing more than a threshold amount (e.g., 0.5-1.0% difference), the localization error monitoring component may identify an error with the respective wheel.

In some examples, the localization error monitoring component may identify errors associated with one or more of the metrics (e.g., variances, residuals, correction factors) and may provide the information to the planner component. In such examples, the errors may be based on the associated variance, residual, and/or correction factor being out of tolerance (e.g., exceeding a threshold). The planner component may determine an action to take based on the identified errors. The actions may include taking the associated system offline (e.g., disregard for vehicle control operations), stopping the vehicle, slowing down to a pre-determined velocity (e.g., 25 miles per hour, 25 kilometers per hour, etc.), and/or slowing down a pre-determined amount (e.g., slowing to 50% of the speed, decreasing forward speed by 10 miles per hour, etc.), refraining from certain actions (e.g., limiting a speed, limiting a turning radius, limiting an acceleration, etc.), though any other maneuver is contemplated. In some examples, the vehicle control operations may be determined based on a determination to take a system offline. For example, based on a determination to take a first of three IMUs offline, the planner component may slow the vehicle speed to a maximum of 20 kilometers per hour. Though this is merely an example, and any other systems and/or speeds are contemplated herein.

In some examples, the action may be based on the localizer and/or vehicle system associated with the error. For example, an error associated with an IMU localizer may result in the planner component ceasing operation (e.g., stopping the vehicle). In some examples, the localizers and/or vehicle systems may be ranked in a hierarchy, such as based on importance to vehicle control. In some examples, the hierarchy may be a pre-determined hierarchy. In some examples, the hierarchy may be dynamically determined, such as based on the environmental considerations. For example, on a rainy day, the planner component may determine to rank errors associated with wheel slips (e.g., based on correction factors and/or residuals) below errors associated with other systems, based on an increased proclivity to wheel slips on wet surfaces. In such examples, the planner component may be configured to ignore temporary wheel slips on a rainy day.

Techniques described herein provide various technical and/or operational benefits to vehicles, such as autonomous vehicles or other robotic platforms. For example, by utilizing metrics from individual localizers to determine errors associated therewith, techniques described herein offer a more sophisticated "check" on localization than is present with current techniques. That is, the localization error monitoring component provides context associated with localization and identified errors to the planner component that is not used in current techniques. The context provided to the planner component may enable the planner component to determine whether it needs to disengage systems (e.g., localizers, sensors, etc.) associated with a vehicle and/or cause the vehicle to slow down or stop operation (e.g., pull over to the side of a highway or a congested area). That is, by leveraging the context made available by accessing outputs of the individual localizers, the planner component is able to continue controlling the vehicle (e.g., driving autonomously) even though the localization errors are not yet resolved (e.g., metrics include acceptable values).

In addition to providing a more sophisticated "check," techniques described herein enable the planner component to handle errors in localization more safely. That is, by leveraging context made available by accessing outputs of the localizers and/or other systems and enabling the vehicle to continue driving instead of pulling over to the side of a highway or congested area, for example, techniques described herein enable autonomous vehicles to more safely drive within an environment.

Techniques described herein can be implemented in a number of ways. Example implementations are provided below with reference to the following figures. Example implementations are discussed in the context of autonomous vehicles; however, the methods, apparatuses, and systems described herein can be applied to a variety of systems (e.g., a sensor system or a robotic platform), and are not limited to autonomous vehicles. Additionally, the techniques described herein can be used with real data (e.g., captured using sensor(s)), simulated data (e.g., generated by a simulator), or any combination of the two.

FIG. 1 illustrates a block diagram of an example localization error monitoring system 100 of a vehicle, in accordance with examples of this disclosure. In at least one example, the localization error monitoring system 100 may include a vehicle 102, such as an autonomous vehicle, semi-autonomous vehicle, or manually controlled vehicle.

In at least one example, the vehicle 102 may include an autonomous vehicle configured to operate (e.g., drive) within an environment. An autonomous vehicle can be configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such an example, since an autonomous vehicle may be configured to control all functions from start to stop, including all parking functions, it may be unoccupied. This is merely an example, and the systems and methods described herein can be incorporated into any ground-borne, airborne, or waterborne vehicle, including those ranging from vehicles that need to be manually controlled by a driver at all times, to those that are partially or fully autonomously controlled.

The vehicle 102 may include a localization component 104. The localization component 104 may include functionality to receive sensor data from one or more sensors 106 and map data associated with one or more maps 108 to determine a state of the vehicle 102 (e.g., one or more of an x-, y-, z-position, x-, y-, z-velocities and/or accelerations, roll, pitch, or yaw, roll, pitch, or yaw velocities and/or accelerations, etc.). In at least one example, the state of the vehicle 102 may be represented by degrees of freedom e.g., 12 degrees of freedom, 15 degrees of freedom). The sensors 106 used to determine the state may include, but are not limited to, lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, lateral velocity sensor (e.g., sensor that determines lateral speed based on ground tracking), etc.), cameras (e.g., red, green blue (RGB), infrared (IR), intensity, depth, etc.), wheel encoders, environment sensors (e.g., temperature sensors, humidity sensors, light sensors, pressure sensors, etc.), time-of-flight (ToF) sensors, etc. In some examples, the localization component 104 may determine the state of the vehicle 102 based on one or more odometry sensors 110. The odometry sensors may include wheel speed sensors, motor speed sensors, steering angle sensors, and the like.

In at least one example, the localization component 104 may include and/or request/receive map data associated with map(s) 108 of an environment and may continuously determine a location and/or orientation (e.g., state) of the vehicle within the map(s) 108. A map(s) 108 may be any number of data structures that are capable of providing information about an environment, such as, but not limited to, topologies (such as junctions, lanes, merging zones, etc.), streets, mountain ranges, roads, terrain, and the environment in general. Map(s) 108 may be associated with real environments or simulated environments. In some examples, the map(s) 108 may include tile maps, feature maps, and/or other types of maps, such as those described in the U.S. patent applications described above. In some examples, the map(s) 108 may include data regarding a drivable surface over which the vehicle travels in the environment. In some examples, the data may include a road pitch (e.g., grade), a road tilt, a surface type, surface friction, and/or other information associated with the drivable surface over which the vehicle 102 may travel.

In various examples, the localization component 104 may include an IMU 112 and/or one or more localizers configured to determine the state of the vehicle 102. In such examples, the IMU 112 and/or each localizer may process sensor data from one or more of the sensors 106 and/or 110 and/or map data from the map(s) 108 to determine at least a portion of the state of the vehicle 102 (or otherwise determine an intermediate variable used to determine a state or partial state of the vehicle 102). The at least the portion of the state of the vehicle 102 may be described herein as a pseudo measurement, which may be used to determine a total state (e.g., global state) of the vehicle 102. In the illustrative examples, the localization component 104 may include the IMU 112, a lidar localizer 114, a radar localizer 116, a visual localizer 118, and a GPS localizer 120. Though this is not intended to be limiting and additional localizers may be contemplated herein. For example, the lidar localizer 114 may receive lidar data from a plurality of lidar sensors 106 and map data associated with one or more maps 108. Based on the lidar data and the map data, the lidar localizer 114 may output an estimated location of the vehicle 102, as a portion of the state thereof. For another example, the IMU 112 may receive IMU data from one or more IMU sensors 106 and odometry data from one or more odometry sensors 110. The IMU 112 may determine an orientation of the vehicle 102 as a portion of the state thereof, based on the sensor data associated with the IMU sensor 106 and the odometry sensor(s) 110.

In various examples, the localization component 104 may be configured to combine (e.g., fuse) the state data from the IMU 112 and/or, 114, 116, 118, and/or 120 to determine a global state (e.g., state, total state, etc.) of the vehicle. In some examples, the localization component 104 may fuse the measurements from the IMU 112 and/or the localizers 114, 116, 118, and/or 120 into an optimized state of the vehicle 102. In such examples, the localization component 104 may optimize the state measurements associated with each of the IMU 112 and/or the localizers 114, 116, 118, and/or 120. In at least one example, at least one of the IMU 112 and/or the localizers 114, 116, 118, and/or 120 and/or the localization component 104 may determine the optimized state of the vehicle 102 utilizing SLAM (simultaneous localization and mapping), CLAMS (calibration, localization and mapping, simultaneously), relative SLAM, bundle adjustment, non-linear least squares optimization, Bayesian filters (such as Kalman filters) or the like to receive respective data (e.g., image data, lidar data, radar data, IMU data, GPS data, wheel encoder data, etc.) to accurately determine a location (and/or a state) of the vehicle 102.

In various examples, a localization error monitoring component 124 of the planner component 122 may receive state information from an IMU 112 and/or the localizers 114, 116, 118, and/or 120 and/or global state information from the localization component 104 (collectively state information). The state information may include a current location, position, orientation, velocity and/or acceleration associated with the vehicle. In some examples, the state information may include one or more metrics associated with the state and/or measurements associated therewith. In at least on example, the localization error monitoring component 124 may be configured to determine an error associated with the state information provided by a particular localizer of the localization component 104. In some examples, the metrics may include variances (and/or covariances) associated with a state, residuals associated with measurements corresponding to the state, and/or correction factors applied to vehicle systems.

As illustrated in FIG. 1, the localization error monitoring component 124 may include a variance component 126. The variance component 126 may be configured to receive state information output by the localization component 104 (e.g., global state) and determine one or more variances and/or covariances values 128 associated with the output. A variance value 128 for each estimated state may include a confidence determined by the respective localizer that the estimated state is accurate. In some examples, the variances values 128 may be estimated by propagating the expected uncertainty from the inputs to the estimates using a linearized system. In some examples, variance value 128 may include a covariance associated with an estimated state of the vehicle 102. In such examples, the variance component 126 may determine a variance value 128 associated with two or more dimensions. For example, the variance value 128 may include a variance across a pitch, roll, and yaw of the vehicle.

In various examples, the variance component 126 may include one or more variance thresholds 130. In some examples, the variance component 126 may compare the variance and/or co-variance to a variance threshold 130. The variance threshold(s) 130 may be determined based on an alert limit associated with the monitored state. In at least one example, the variance threshold(s) 130 may be determined utilizing the following equation:

$$\left(\frac{AL_{state}}{\Phi^{-1}\left[\frac{P}{2}\right]}\right)^2, \quad (1)$$

where $AL_{state}$ is the alert limit for the monitor state, $\phi^{-1}$ is the inverse normal Cumulative Distribution Function (CDF) and P is a given probability associated with a likelihood of obtaining an error greater than the AL at a given time.

In some examples, the variance threshold(s) 130 may include a maximum variance (or covariance) allowed by an IMU 112 and/or a localizer 114, 116, 118, and/or 120 and/or localization component 104. In such examples, the variance component 126 may compare outputs from each of the IMU 112 and/or the localizers 114, 116, 118, and/or 120 and/or localization component 104 to determine an error with the respective system. In some examples, the variance threshold(s) 130 may be based on a particular IMU and/or localizer 114, 116, 118, and/or 120, one or more sensors 106 and/or 110 associated with the state determination, and/or one or more maps 108 associated with the state determination. In such examples, the variance threshold(s) 130 may be specific to particular localizers, sensors, and/or maps associated with a determined state. For example, the variance component 126 may include a first variance threshold 130 associated with a lidar localizer 114 and a second variance threshold 130 associated with a visual localizer 118. The variance component 126 may apply the first variance threshold 130 to first state information output by the lidar localizer 114 and the second variance threshold 130 to second state information output by the visual localizer 118.

As illustrated in FIG. 1, the localization error monitoring component 124 may include a residual component 132 configured to receive state information output by an IMU and/or a localizer 114, 116, 118, and/or 120 and determine one or more residual values 134 associated with measurements of the state information. In some examples, the residual value 134 may include an a priori residual. In such examples, the residual value 134 may include a residual associated with a predicted measurement associated with the IMU 112 and/or localizers 114, 116, 118, and/or 120. In some examples, the residual value(s) 134 may include the residuals associated with measurements captured by at least one of the IMU 112 and/or localizers 114, 116, 118, and/or 120. The residual value(s) 134 may represent a difference between an observed value (e.g., based on sensor input) and an estimated value of a quantity of interest (e.g., estimated pitch, roll, yaw, location in a coordinate system and/or dimension, velocity, etc.). In some examples, the estimated value may be based in part on a value associated with a previous time step (e.g., value associated with a measurement taken 0.06 seconds prior to the current measurement), such as that propagated forward to a current time associated with the observed value, in such examples, the estimated value may be determined using an integration or filter associated with the time step (e.g., amount of time associated therewith). In some examples, the residual value(s) 134 may represent inconsistencies in the measurements. For example, a residual value 134 may include a difference between an observed velocity at a time and a velocity at a previous time step.

In various examples, the residual value(s) 134 may include pre- or post-optimization measurements. In various examples, the residual value(s) 134 may be associated with raw and/or processed sensor data received from a sensor 106 and/or 110, In some examples, the residual value(s) 134 may be associated with pseudo measurements associated with the state of the vehicle 102, such as those determined based on the IMU 112 and/or individual localizers 114, 116, 118, and/or 120. In some examples, the residual value(s) 134 may be associated with a total state of the vehicle, such as that determined by localization component 104.

In various examples, the residual component 132 may include one or more residual thresholds 136. In some examples, the residual threshold(s) 136 may include control data associated with the IMU 112 and/or the localizers 114, 116, 118, and/or 120 and/or respective sensors 106 and/or 110. In some examples, the residual threshold(s) 136 may include a maximum residual allowed by a localization component 104. In such examples, the residual threshold(s) 136 may include a maximum difference between any expected and observed measurement value, irrespective of the sensor 106 and/or 110, and/or IMU 112 and/or localizer 114, 116, 118, and/or 120 associated therewith. In some examples, the residual threshold(s) 136 may include individual maximum values associated with particular measurements output by the IMU 112 and/or the localizers 114, 116, 118, and/or 120. In such examples, the residual threshold(s) 136 may be based on the particular measurement associated with the residual value 134. In various examples, the residual component 132 may compare the residual value(s) 134 to the residual threshold(s) 136 associated with the measurements. In such examples, based on the comparison, the localization error monitoring component may determine the extent (e.g., size) of the error.

In various examples, the residual component 132 may be configured to determine an error associated with an IMU 112 and/or a localizer 114, 116, 118, and/or 120 and/or a sensor

106 and/or 110 based on the residual value(s) 134 and/or a comparison to the residual threshold(s) 136. In some examples, the residual component 132 may determine the error based on a single residual value 134 exceeding an associated residual threshold 136. In various examples, responsive to determining the error, an input modality may be disregarded in vehicle planning considerations. In some examples, the input modality (e.g., sensor 106 and/or 110, an IMU 112 and/or a localizer 114, 116, 118, and/or 120) may be removed from consideration in determination of an overall state of the vehicle 102, such as that determined by the localization component 104.

In various examples, after removing a single input modality from consideration, the residual component 132 may determine the error based on a sum of the remaining residual values 134 associated with a particular IMU 112 and/or a particular localizer 114, 116, 118, and/or 120 and/or a sensor 106 and/or 110. In such examples, the residual component 132 may determine whether the sum of the remaining residual values 134 meets or exceeds a total residual threshold 136 (e.g., threshold associated with a summation of residuals). In some examples, based on a determination that a sum of the input residual values 134 exceeds the total residual threshold 136, the residual component 132 may provide an indication of the error to the planner component 122. In some examples, the planner component 122 may determine the action for the vehicle 102 to take based on the error.

In various examples, the variance component 126 and/or the residual component 132 may additionally compare the residuals value(s) 134 to the associated variances value(s) 128. In such examples, measurements associated with a state may be compared to confidences in the state. In some examples, the residual value(s) 134 may be normalized by the variance value(s) 128 (e.g., modified to a same scale as the variance value(s) 128). In such examples, the comparison may result in a whitened residual. In some examples, the residual component 132 may determine a value associated with the whitened residual. Based on the value associated with the whitened residual, the residual component 132 may determine whether the residual value 134 exceeds a residual threshold 136. In some examples, the residual component 132 may identify an error in the associated IMU 112 and/or localizer 114, 116, 118, and/or 120 and/or sensor 106 and/or 110 based on the comparison of the value associated with the white in the residual to a residual threshold 136. In various examples, the localization error monitoring component may provide data associated with an error to the planner component 122, such as for vehicle 102 control considerations.

In various examples, the residual component 132 may be configured to assign weights (e.g., 1.2, 1.5, etc.) to residual(s) associated with different localizers. In some examples, the weights may represent an importance of the IMU 112 and/or the localizer 114, 116, 118, and/or 120 and/or associated sensor 106 and/or 110 to the control of the vehicle. In some examples, the weights may represent a confidence in the associated system of the vehicle 102. The weights may be determined based on testing, experimental data, empirical analysis, machine teaming, and the like. In some examples, the weights may be applied based on one or more environmental considerations (e.g., road conditions, time of day, level of darkness, etc.). In such examples, the residual component 132 may be configured to dynamically adjust weights based on changing environmental conditions, assigning different importance levels to particular localizers based on the environmental conditions. For example, during daylight hours on a sunny day, a visual localizer may be weighed higher than a lidar localizer 114. However, at night on a dark night, the lidar localizer 114 may be weighed higher than the visual localizer 118 due to a decreased visual acuity of the cameras.

In some examples, the weights may increase the residual value 134 (e.g., actual residual×1.3, etc.). In such examples, the residual component 132 may determine an error associated with a critical system at a lower actual residual value 134, to maximize the safe operation of the vehicle. For example, based on a high residual on one or more measurements determined by an IMU 112, such as that resulting from a weighted residual value 134, the planner system may determine stop forward movement of the vehicle.

In some examples, the residual component 132 may identify a high residual associated with a particular IMU 112 and/or a particular localizer 114, 116, 118, and/or 120 and/or particular sensor 106 and/or 110 and may compare the high residual to another residual value 134 associated with a same or similar type of IMU and/or localizer 114, 116, 118, and/or 120 (or other vehicle component, e.g., wheel, etc.) and/or same or similar type of sensor 106 and/or 110 (e.g., redundant localizers and/or sensors). In such examples, the residual component 132 may be configured to determine whether the particular IMU 112 and/or the particular localizer 114, 116, 118, and/or 120 and/or particular sensor 106 and/or 110 is failing and/or is experiencing a temporary glitch, or if the sensor inputs to the particular localizer is wrong (e.g., uncalibrated sensor). For example, a vehicle 102 comprising four wheels may include four-wheel speed measurements. The residual component 132 may determine that a first wheel speed measurement includes a high residual value 134. The residual component 132 may compare the single wheel to the three other wheels to determine that the first wheel includes an erroneous measurement, such as that due to a wheel slip. The residual component 132 and/or planner component 122 may determine to ignore the erroneous measurement for a particular time step.

In some examples, the residual component 132 may monitor the residual value(s) 134 over a period of time. In such examples, based on a determination that a particular IMU 112 and/or a particular localizer 114, 116, 118, and/or 120 and/or particular sensor 106 and/or is outputting measurements with high residual value(s) 134 over a threshold period of time, the residual component 132 may determine that the particular IMU 112 and/or the particular localizer 114, 116, 118, and/or 120 and/or particular sensor 106 and/or 110 is out of calibration and/or should be disregard for vehicle control considerations. For example, an IMU 112 may receive data from four different IMU sensors 106. The IMU 112 may have associated therewith four residual values 134 corresponding to measurements associated with the different IMU sensors 106. Based on a determination that a first IMU sensor of the four IMU sensors 106 has a residual value 134 that is above a residual threshold 136 for greater than a threshold amount of time, the residual component 132 may identify an error in the first IMU sensor.

In some examples, the planner component 122 may determine to disregard sensor 106 and/or 110 inputs and/or determine actions for the vehicle to take based on measurements associated therewith based on a number of redundant sensors 106 and/or 110 available. In some examples, based on a determination that a threshold number of sensors 106 and/or 110 are operational, the planner component 122 may continue vehicle operation. In some examples, based on a determination of an error associated with a sensor 106 and/or 110 and an insufficient number of alternate systems available, the planner component 122 may determine to cease vehicle 102 operation. In such examples, the planner component 122 may pull the vehicle 102 over and/or stop the vehicle 102 to ensure maximum safe operation of the vehicle 102.

In some examples, the localization error monitoring system 100 may maximize safe operation by determining that one or more correction factors associated with vehicle systems (e.g., sensors 106 and/or 110, wheels, etc.) are within limits. In such examples, the localization error monitoring component 124 may include a correction factor component 138 configured to determine one or more correction values 140 applied to one or more vehicle systems. The correction values 140 may include IMU biases, map distortion factors, wheel diameter scale factors, and the like. The correction values 140 may include values used to correct for input errors that are known to follow a predefined model. The correction factors 140 may be applied relevant measurements (e.g., measurements associated with relevant components (e.g., IMU, wheel odometry sensors, etc.)). In some examples, the correction values 140 may have associated maximum and/or minimum correction thresholds 142. In some examples, the correction factor component 138 may determine whether an applied correction value 140 exceeds the correction threshold 142 (e.g., at or above the maximum, at or below the minimum). For example, a radius of a wheel on a vehicle 102 may change over a period of time of vehicle operation. The change to the radius may not be calibrated prior to vehicle operation, as the exact temperatures, road conditions, etc. may not be known prior to release. A wheel scale error may include a determination of how fast the wheel is spinning as compared to how fast it should be spinning. The correction value 140 may account for the radius of the wheel and odometry, such as to correct for slight changes in the radius and resulting wheel speed. Based on a determination that the correction value 140 exceeds a correction threshold 142, such as based on the radius of the wheel increasing or decreasing more than a threshold amount (e.g., 0.5-1.0% difference), the correction factor component 138 may identity an error with the respective wheel.

In some examples, the localization error monitoring component 124 may identify errors associated with the IMU 112 and/or one or more localizers 114, 116, 118, and/or 120 and/or one or more sensors 106 and/or 110 based on metrics evaluated by the variance component 126, the residual component 132, and/or the correction factor component 138. In some examples, the localization error monitoring component 124 may provide error data 144 associated with the error to the planner component 122. In some examples, the error data 144 may include information corresponding to the IMU 112 and/or the localizer(s) 114, 116, 118, and/or 120 and/or the sensor(s) 106 and/or 110, the variance value(s) 128, residual value(s) 134, and/or correction value(s) 140 associated with the error, an amount the aforementioned value(s) 128, 134, and 140 exceed the respective thresholds 130, 136, and/or 142, a number and/or type of redundant systems, a weighed value (e.g., importance) of the IMU 112 and/or the particular localizer(s) 114, 116, 118, and/or 120 and/or the sensor(s) 106 and/or 110, and/or any other data consumed to inform a decision on an action for the vehicle to take.

The planner component 122 may receive the error data 144 and determine an action for the vehicle 102 to take based on the identified errors. The actions may include taking the associated IMU 112 and/or localizer(s) 114, 116, 118, and/or 120 and/or the sensor(s) 106 and/or 110 offline (e.g., disregard for vehicle control operations), stopping the vehicle 102, slowing down to a pre-determined speed, and/or slowing down a pre-determined amount (e.g., slowing to 50% of the speed, decreasing forward speed by 10 miles per hour, etc.), refraining from certain actions (e.g., limiting a speed, limiting a turning radius, limiting an acceleration, etc.), though any other maneuver is contemplated. In some examples, the vehicle control operations may be determined based on a determination to take an IMU 112 and/or the localizer(s) 114, 116, 118, and/or 120 and/or the sensor(s) 106 and/or 110 offline. For example, based on a determination to take one of eight lidar sensors offline, the planner component 122 may slow the vehicle speed to a maximum of 25 miles per hour. Though this is merely an example, and any other systems and/or speeds are contemplated herein.

In some examples, the action may be based on the IMU 112 and/or localizer(s) 114, 116, 118, and/or 120 and/or the sensor(s) 106 and/or 110 associated with the error. For example, an error associated with an IMU 112 may result in the planner component 122 ceasing operation (e.g., stopping the vehicle 102). In some examples, the IMU 112 and/or localizer(s) 114, 116, 118, and/or 120 and/or the sensor(s) 106 and/or 110 may be ranked in a hierarchy, such as based on importance to vehicle control. In some examples, the hierarchy may be a pre-determined hierarchy. In some examples, the hierarchy may be dynamically determined, such as based on environmental considerations. For example, on a rainy day, the planner component 122 may determine to rank errors associated with wheel slips (e.g., based on correction values 140 and/or residual values 134) below errors associated with other systems, based on an increased proclivity to wheel slips on wet surfaces. In such examples, the planner component 122 may be configured to ignore temporary wheel slips on a rainy day.

In various examples, the planner component 122 may be configured to send the error data 144 to a remote computing device 146, such as via one or more networks 148 (e.g., a wired or wireless network). In some examples, the remote computing device 146 may include a computing device having at least one processor 150 and memory 152. In some examples, the remote computing device 146 may be associated with a monitoring and/or maintenance system to monitor the status of the vehicle 102 and/or various components of the vehicle 102 and/or to provide maintenance to the various components of the vehicle 102. Accordingly, the error data 144 may provide the remote computing device 146 and/or a person using the remote computing device 146 with a comprehensive package of information related to a status of the various vehicle components that includes errors in the error data 144 and information about associated vehicle 102 systems (e.g., IMU 112 and/or localizers 114, 116, 118, and/or 120 and/or sensors 106 and/or 110.

Figure 2:
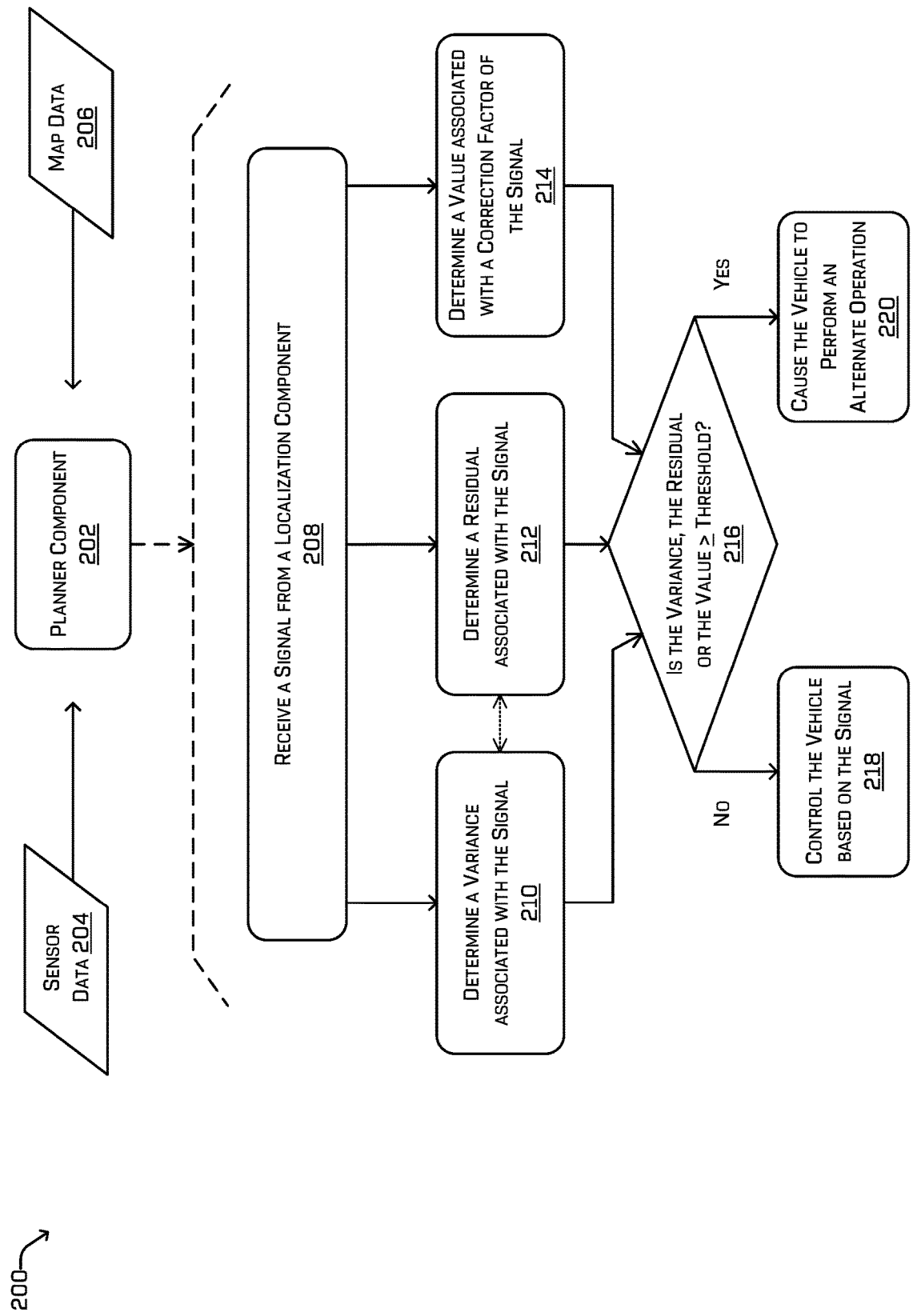
FIG. 2 illustrates an example environment for determining how to control a vehicle based at least in part on using output from a localization component of a vehicle, as described herein.

FIG. 2 illustrates an example environment 200 for determining how to control a vehicle, such as vehicle 102, based at least in part on using output from a localization component, such as localization component 104 of a vehicle, as described herein.

In at least one example, the vehicle may include a planner component 202 configured to receive sensor data 204 from the sensor system(s) associated with the vehicle, such as sensors 106 and/or 110, and/or map data 206 associated with the environment within which the vehicle is positioned. In some examples, the planner component 202 may be configured to control the vehicle based at least in part on the sensor data 204, the map data 206, and/or any determinations made by other components associated with the vehicle (e.g., localization, perception, prediction, etc). In at least one example, an output of the planner component 202 may include one or more instructions for causing or otherwise controlling the vehicle to travel within the environment. In some examples, the one or more instructions may include a velocity aspect, an acceleration aspect, a steering angle aspect, a navigation aspect, etc. for controlling the vehicle for a period of time (e.g., a prescribed number of seconds into the future). That is, in at least one example, the output can comprise a trajectory and/or route along which the vehicle is to drive for a period of time.

In various examples, the planner component 202 may receive a signal from a localization component, as illustrated at operation 208. The localization component may include one or more localizers, such as one or more IMU localizers, lidar localizers, radar localizers, visual localizers, GPS localizers, and the like. In some examples, the localization component may include a global localizer. In such examples, the global localizer may be configured to combine localization data from the localizer(s) to determine a global state (e.g., location, position, orientation, velocity, acceleration, etc.) of the vehicle at a given time. In some examples, the signal may include information associated with the global state information associated with pseudo measurements including portions of the state of the vehicle (e.g., determined by an IMU and/or one or more localizers), raw sensor data and/or processed sensor data. The state information may include one or more of the one or more of an x-, y-, z-position, x-, v-, z-velocities and/or accelerations, roll, pitch, or yaw, roll, pitch, or yaw velocities and/or accelerations, and the like. In at least one example, the signal may include an optimized state of the vehicle at a given time.

Additionally, the signal may include one or more metrics associated with the state of the vehicle. The metric(s) may be associated with individual dimensions (e.g., metric associated with the x-position, the roll, etc.) and/or across two or more dimensions (e.g., metric associated with XY velocity, etc.). In at least one example, the metric(s) include a variance associated with a state of the vehicle, a residual associated with a measurement corresponding to the state, and/or a value of a correction factor applied to correct an input error associated with a system (e.g., wheels scale error. IMU bias, etc.). As used herein, the variance may include a covariance associated with the signal.

At operation 210, the planner component 202 may determine a variance associated with the signal. The variance may include a confidence determined by the localization component that an estimated state is accurate. In some examples, the variance may be determined based on a linearized system. In some examples, the variance may include a covariance for each estimated state of the vehicle. In such examples, the variance may include a confidence in an estimated state across two or more dimensions. For example, the covariance may include a variance across longitudinal and lateral dimensions e.g., X/Y). For another example, the covariance may include a variance across a pitch, roll, and yaw of the vehicle.

At operation 212, the planner component 202 may determine a residual associated with the signal. The residual may represent a difference between an observed value (e.g., based on sensor input) and an estimated value of a quantity of interest (e.g., estimated pitch, roll, yaw, location in a coordinate system and/or dimension, velocity, etc.). In some examples, the estimated value may be based in part on a value associated with a previous time step (e.g., value associated with a measurement taken 0.1 second prior to the current measurement), such as by propagating the value associated with the previous time step forward to a current time. In such examples, the residual may represent inconsistencies in the measurements. For example, a residual may include a difference between an observed velocity at a time and a velocity at a previous time step. Based on determining the difference, the planner component may determine that a system associated with the velocity measurement may be generating an error. In various examples, the planner component may compare the residuals to pre-determine threshold residuals associated with the measurements. In such examples, based on the comparison, the planner component may determine the extent (e.g., size) of the error.

In various examples, the planner component may additionally compare the residual to the associated variance determined at operation 210. In such examples, a measurement associated with a state may be compared to the confidence in the state. In some examples, the residual may be normalized by the variance (and/or covariance). In such examples, the comparison may result in a whitened residual. In some examples, the planner component may determine the white in the residual. In such examples, the white in the residual may be compared to a threshold, such as at operation 216, discussed below.

At operation 214, the planner component 202 may determine a value associated with a correction factor of the signal. The correction factor may include an IMU bias, a map distortion factor, wheel diameter scale factor, and the like. The correction factor may be used to correct for input errors. In some examples, the correction factor may be applied to input errors that are known to follow a predefined model.

At operation 216, the planner component 202 may determine whether the variance, the residual, or the value associated with the correction factor meet or exceed a threshold. In some examples, the threshold may include one or more variance thresholds, residual thresholds, and/or correction thresholds. In some examples, the respective thresholds may be determined based on a localizer associated with the variance, residual, and/or correction threshold. In some examples, the respective thresholds may be determined based on a sensor associated with the variance, residual, and/or correction threshold.

In some examples, the thresholds may include a threshold period of time (e.g., maximum time, 1 second, 0.5 seconds, etc.) at which a value associated with a residual and/or correction factor may be above a threshold. In such examples, a determination that a residual and/or correction factor exceeds a threshold may be based on a determination that the residual and/or correction factor has remained high for the threshold period of time or longer. For example, a first correction factor associated with a first wheel speed may exceed a threshold correction factor value at a first time. At a second time less than the threshold period of time after the first time, a second correction factor associated with a second wheel speed may be less than the threshold. The planner component 202 may determine that the error was temporary (e.g., temporary glitch caused by a wheel slip or the like) and that the value did not exceed the threshold. However, at a third time, a third correction factor associated with a third wheel speed may exceed the threshold correction factor and at a fourth time greater than the threshold period of time from the third time, a fourth correction factor associated with a fourth wheel speed may also exceed the threshold correction factor. Based on the exceedance for greater than the threshold period of time, the planner component 202 may determine that the correction factor value exceeds the threshold.

Based on a determination that at least one of the variance, the residual, or the value do not exceed a threshold ("No" at Operation 216), the planner component 202 may, at operation 218, control the vehicle based on the signal. In some examples, the planner component 202 may determine an initial location of the vehicle based on the signal. In such examples, the planner component 202 may determine a trajectory for the vehicle to travel through the environment based on the initial location. In various examples, the planner component 202 may control the vehicle based on the signal utilizing the techniques described in U.S. patent application Ser. No. 16/517,506, filed Jul. 19, 2019 and entitled "Unstructured Vehicle Path Planner," and U.S. patent application Ser. No. 16/539,928, filed Aug. 13, 2019 and entitled "Cost-Based Path Determination," the entire contents of both applications are incorporated herein by reference.

Based on a determination that at least one of the variance, the residual, or the value do exceed a threshold ("Yes" at Operation 216), the planner component 202 may, at operation 220, cause the vehicle to perform an alternate operation. The alternate operation may include slowing the vehicle to a pre-determined speed (e.g., 17 Miles per hour, 25 kilometers per hour, etc.), slowing the vehicle to a fraction of a previous speed (e.g., reducing to 60% of previous velocity), or stopping the vehicle, refraining from certain actions (e.g., limiting a speed, limiting a turning radius, limiting an acceleration, etc.), though any other maneuver is contemplated. For example, based on a determination that the variance exceeds the threshold, the planner component may determine to stop the vehicle (e.g., pull over to a side of the road).

In some examples, the alternate operation may include comparing data associated with different sensors of a same or similar type. For example, a planner component 202 may determine that a residual associated with a first IMU exceeds a threshold, but that residuals associated with second and third IMUs do not exceed the threshold. Based at least in part on the comparison, the planner component may determine to slow forward movement of the vehicle to a reduced velocity (e.g., pre-determined or fraction of a current speed).

In some examples, the alternate operation may include disregarding the sensor and/or localizer associated with the threshold exceedance. In some examples, the alternate operation may include disregarding the particular degree of freedom (e.g., value in a particular dimension) associated with the exceedance. In such examples, the planner component 202 may determine that the particular degree of freedom is not relevant to the control of the vehicle, and may remove the values associated therewith (e.g., variance, residual, etc.) in vehicle control considerations. For example, the planner component 202 may determine that a residual associated with a z-height of the vehicle exceeds a threshold. Based on a determination that the z-height is not relevant to the vehicle traveling on a substantially flat road (e.g., <3% grade, etc.), the planner component 202 may determine to disregard the z-height and associated residual from vehicle control planning considerations. For another example, the planner component 202 may determine that a residual associated with a lateral velocity of the vehicle exceeds a threshold value. Based on a determination that the lateral velocity is relevant to the vehicle, the planner component 202 may determine to slow the forward velocity of the vehicle until the error is resolved.

In some examples, the alternate operation may include sending data associated with the error to a remote computing device, such as remote computing device 146. In some examples, the remote computing device may be configured to assess the error and/or perform diagnostic check and/or maintenance on one or more vehicle systems. In some examples, the planner component 202 may additionally send fault data to the remote computing device, such as that described in U.S. patent application Ser. No. 16/712,753, incorporated herein by reference above. In such examples, based on the error data and/or the fault data provided by the planner component 202 (e.g., vehicle computing system of the vehicle), the remote computing device may identify the particular sensor and/or localizer providing erroneous data.

Figure 3:
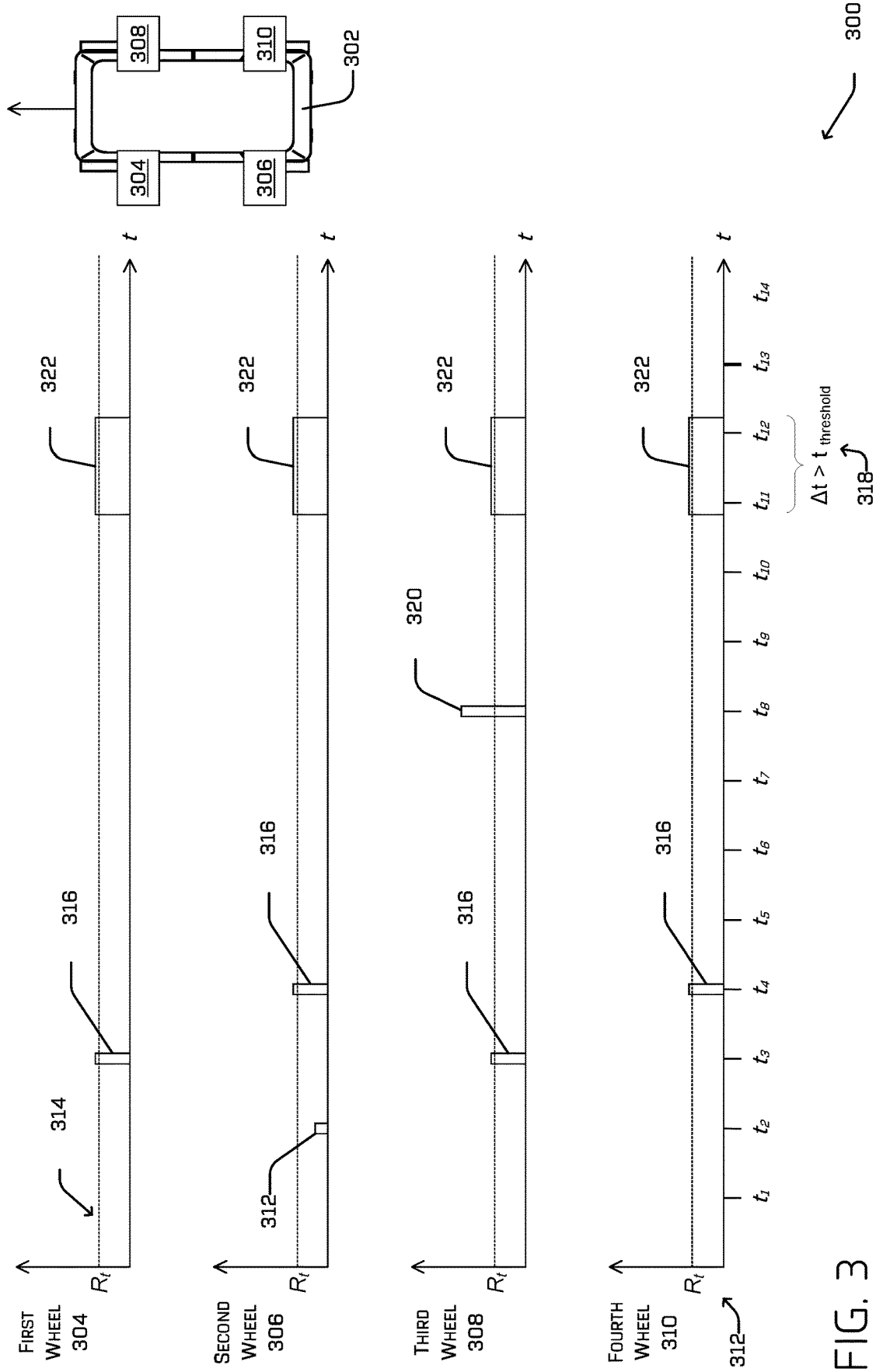
FIG. 3 is an example chart of residuals associated with wheels of a vehicle determined over time, as described herein.

FIG. 3 is an example chart 300 of residuals (e.g., residuals 312, 316, etc.) associated with wheels of a vehicle 302 determined over time, as described herein. In the illustrative example, the vehicle 302 may include four wheels, a first wheel 304, a second wheel 306, a third wheel 308, and a fourth wheel 310, This is not intended to be limiting and the vehicle may include a greater or lesser number of wheels.

In some examples, a localization error monitoring component, such as localization error monitoring component 124, of a planner component, such as planner component 122, may be configured to determine one or more residuals associated with measurements based on sensor data. In the illustrative example, the measurements may include wheel speeds. In other examples, the measurements may include other values associated with state information in any dimension and/or degree of freedom and/or across two or more dimensions or degrees of freedom (e.g., x-, y-, z-positions, x-, y-, z-velocities, pitch, roll, yaw, rates associated therewith, accelerations, and the like. The state information may include information associated with the vehicle and/or as in the illustrative example, a component of the vehicle (e.g., wheels).

In various examples, the localization error monitoring component may evaluate the residual(s) over time. In such examples, the error evaluation error with respect to residuals may be based on temporal statistics associated with the residuals. In various examples, the temporal statistics may enable the localization error monitoring component to determine whether a particular residual at a particular time was an anomaly, such as based on a wheel slip, or if the sensor and/or system associated therewith is consistently producing high residuals indicative of a true error in the sensor and/or system. In some examples, the residuals may be determined based in part on a comparison of a current wheel speed to a wheel speed at a previous time step, such as by integrating the wheel speed at the previous time step or propagating it forward in time to an estimated wheel speed at the current time.

In the illustrative example, a second wheel 306 may include a residual 312 at time $t_2$, the residual 312 being associated with a wheel speed measurement. The residual 312 may result from a difference in the Wheel speed at the time $t_2$, such as compared to the time $t_1$. In some example, the modification may be due to a slight wheel slip due to water on the road, encountering a small pothole, or the like.

As illustrated in FIG. 3, the residual 312 may include a value that is less than a residual threshold 314. In various examples, the residual threshold 314 may be determined based on the particular sensor and/or component associated with the measurement. In some examples, the residual threshold 314 may be determined based on the localizer providing the measurement. In various examples, the residual threshold 314 may be determined based on environmental considerations (e.g., road conditions, weather conditions, time of day, level of darkness, etc.). For examples, the localization error monitoring component may include a first residual threshold 314 for use on a dry day and a second, higher residual threshold 314 for application on a rainy day, such as to account for increased wheel slips due to a wet road surface. Based at least in part on determining that the residual 312 is less than a residual threshold 314, the localization error monitoring component may determine that no error exists in the associated sensor and/or component.

In the illustrative example, at a time $t_3$, the localization error monitoring component may identify a residual 316 corresponding to measurements associated with the first wheel 304 and the third wheel 308. In some examples, the localization error monitoring component may determine that the residuals 316 are above the residual threshold 314. In some examples, based on a determination that the residuals are above the residual threshold 314, the localization error monitoring component may provide error data to a planner component of a vehicle computing system, such as to warn the vehicle computing system of a potential error associated with the sensors (e.g., wheel speed sensor) and/or component (e.g., wheel).

In some examples, based at least in part on the first wheel 304 and the third wheel 308 (e.g., parallel wheels) include the residual 316 (of the same magnitude) at the same time $t_3$, the localization error monitoring component may determine that the residual may be a result of an object encountered on a drivable surface, such as railway tracks, a speed bump, or the like. In some examples, based at least in part on the determination that parallel wheels, such as the first wheel 304 and the third wheel 308 include the same residual 316 at the same time, the localization error monitoring component may determine that the error associated with the residual 316 being over a threshold 314 was a temporary glitch.

In some examples, the localization error monitoring component may determine to delay providing error data to the planner component. In some examples, the delay may include a time until a subsequent determination of residuals (e.g., $t_4$) associated with the wheels 304, 306, 308, and 310. For example, if the residual 316 associated with the first wheel and the third wheel 308 remained above the threshold at time t4, the localization error monitoring component may provide the error data associated therewith to the planner component. As will be discussed below, the localization error monitoring component may report the error data based on a determination that the time associated with the residual 316 being above the residual threshold 314 is above a threshold time, such as threshold time 318.

In the illustrative example, the second wheel 306 and the fourth wheel 310 may have associated therewith the residual 316 at a time $t_4$. As illustrated on the vehicle 302, the second wheel 306 and the fourth wheel 310 may include parallel, rear wheels. In some examples, the vehicle 302 may be bi-directional. In such examples, the second wheel 306 and the fourth wheel 310 may be configured to operate as from wheels. Based at least in part on a determination that measurements associated with the second wheel 306 and the fourth wheel 310 have the associated residual 316 at time t4, substantially the same residual as that associated with the first wheel 304 and the third wheel at time $t_3$, the localization error monitoring component may determine that the error (e.g., residual 316 exceeding the residual threshold 314) is due to the object encountered on the drivable surface. For example, the front Wheels of the vehicle 302 (e.g., first wheel 304 and third wheel 308) may cross over railway tracks at time $t_3$, causing the resulting residual 316 on the measurements associated with the first wheel 304 and third wheel 308. At time $t_4$, the rear wheels of the vehicle 302 (second wheel 306 and fourth wheel 310 may cross over the railway tracks, causing the resulting residual 316 on the measurements associated with the second wheel 306 and the fourth wheel 310. Based on a determination that substantially the same (e.g., within a threshold difference, <3% difference, etc. residual 316 was associated with the front and rear wheels at subsequent times (e.g., $t_3$ and $t_4$), the localization error monitoring component may determine that the error was a temporary and/or based on an external condition or event and should not be reported to the planner component.

As illustrated in FIG. 3, the localization error monitoring component may determine a residual 320 corresponding to a measurement associated with the third wheel 308 at time t8. In some examples, the localization error monitoring component may determine that the residual 320 is above the residual threshold 314, In some examples, the localization error monitoring component may provide error data to the planner component based on the determination that the residual 320 is above the residual threshold 314.

In some examples, the localization error monitoring component may compare the residual 320 to residuals associated with the first wheel 304, the second wheel 306, and the fourth wheel 310. In some examples, based on the comparison, the localization error monitoring component may determine whether the third wheel 308 individually is experiencing an error or if other wheels 304, 306, and/or 310 are also experiencing an error (e.g., such as described above in the railroad track example). In some examples, based on a determination that the third wheel 308 individually includes the high residual (e.g., error), the localization error monitoring component may send an indication to the planner component that the third wheel 308 should be disregarded from vehicle control considerations.

Based on a determination that a measurement corresponding to the third wheel 308 at a subsequent time (e.g., $t_9$) does not include the residual 320, the localization error monitoring component may determine that the error was temporary. In some examples, the localization error monitoring component may send the planner component an indication that the error no longer exists and/or that subsequent measurements (e.g., at time $t_9$, $t_{10}$, etc.) associated with the third wheel 308 may be included in vehicle control considerations.

In the illustrative example, the localization error monitoring component may determine residuals 322 associated with the first wheel 304, the second wheel 306, the third wheel 308, and the fourth wheel 310. As illustrated, the residuals 322 may include a value that is equal to or greater than the residual threshold 314, In various examples, the localization error monitoring component may determine the error with the four wheels 304, 306, 308, and 310 at time and may send error data associated therewith to the planner component. In some examples, the planner component may determine a first action to take, such as to slow down based on the error.

In some examples, the localization error monitoring component may determine that, at a subsequent time, the measurements associated with the wheels 304, 306, 308, and 310 include substantially the same residual 322. In various examples, the localization error monitoring component may determine that a total time ($\Delta t$) associated with the residual is above the threshold time 318. Based on the determination that the total time associated with eh residual 322 is above the threshold time 318, the localization error monitoring component may send updated error data to the planner component. In some examples, the planner component may determine a second action for the vehicle to take, based on the updated error data. In some examples, the second action may include a conservative action, such as to slow the vehicle, to stop the vehicle, or the like. In such examples, planner component may maximize safety during vehicle 302 operation. In some examples, the second action may include a more conservative action from the first action. For example, the first action may include slowing a forward velocity 5 miles per hour and the second action may include slowing the forward velocity by another 10 miles per hour.

Figure 4:
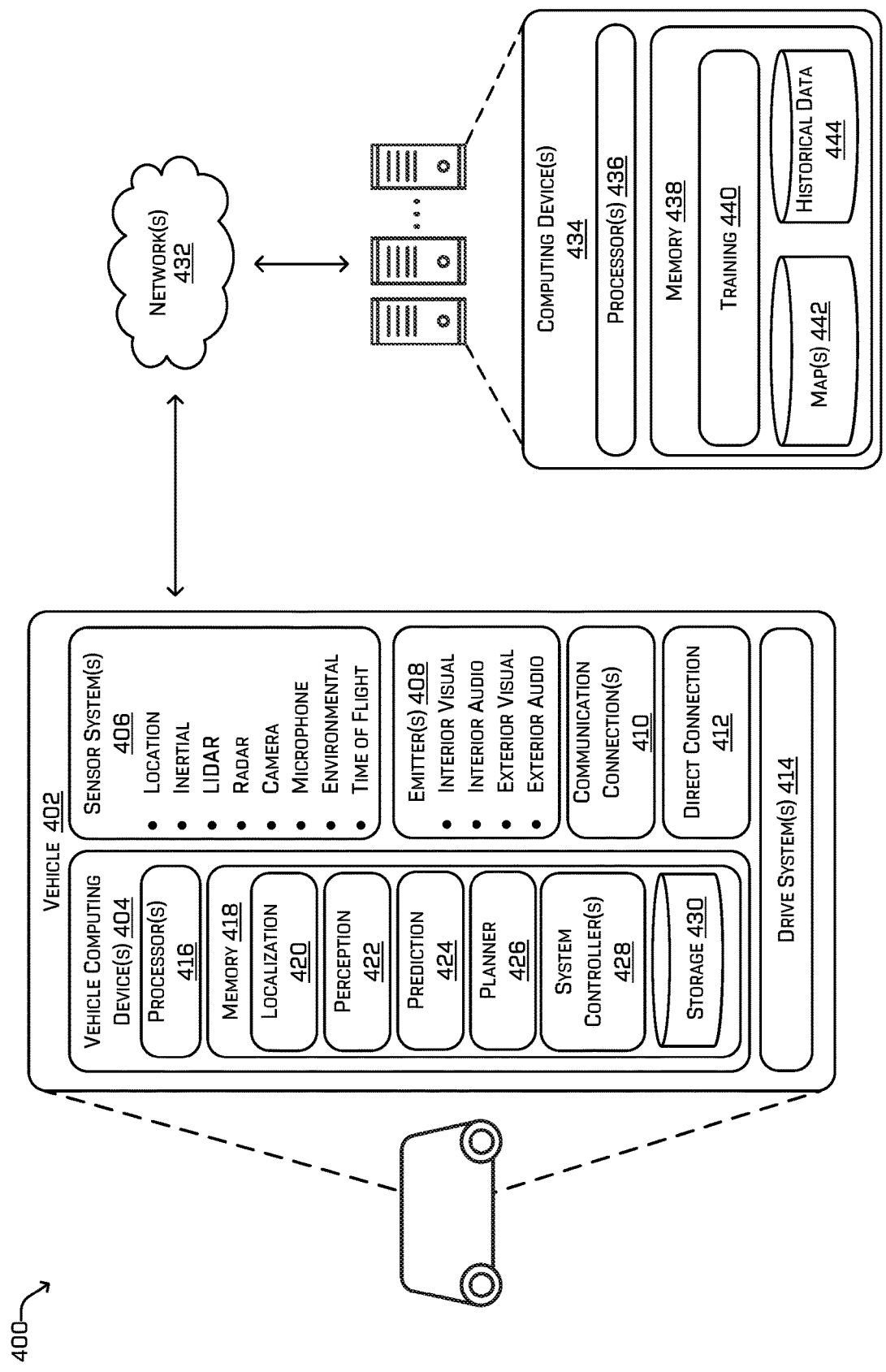
FIG. 4 is a block diagram illustrating an example system for performing techniques, as described herein.

FIG. 4 is a block diagram illustrating an example system 400 for performing techniques, as described herein. In at least one example, a vehicle 402, which may correspond to vehicle 102 of FIG. 1 or 302 of FIG. 3, may include one or more vehicle computing devices 404, one or more sensor systems 406, one or more emitters 408, one or more communication connections 410, at least one direct connection 412, and one or more drive systems 414. As described above, the vehicle 402 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such an example, since the vehicle 402 may be configured to control all functions from start to stop, including all parking functions, it may be unoccupied. This is merely an example, and the systems and methods described herein may be incorporated into any ground-borne, airborne, or waterborne vehicle, including those ranging from vehicles that need to be manually controlled by a driver at all times, to those that are partially or fully autonomously controlled. That is, in the illustrated example, the vehicle 402 is an autonomous vehicle; however, the vehicle 402 could be any other type of vehicle. While only a single vehicle 402 is illustrated in FIG. 4, in a practical application, the example system 400 may include a plurality of vehicles, which, in some examples, can comprise a fleet of vehicles.

The vehicle computing device(s) 404 may include processor(s) 416 and memory 418 communicatively coupled with the processor(s) 416. In the illustrated example, the memory 418 of the vehicle computing device(s) 404 stores a localization component 420 (which may correspond to the localization component 104 described above with reference to FIG. 1), a perception component 422, a prediction component 424, a planner component 426 (which may correspond to the planner component 122 of FIG. 1 and/or planner component 202 of FIG. 2), and one or more system controllers 428. Additionally, the memory 418 may include a storage 430, which can store map(s), model(s), previous outputs, etc. As described above, a map can be any number of data structures that are capable of providing information about an environment, such as, but not limited to, topologies (such as junctions, lanes, merging zones, etc.), streets, mountain ranges, roads, terrain, and the environment in general. Maps can be associated with real environments or simulated environments. Model(s) may include machine learned models, as described below. In some examples, the storage 430 can store previous outputs.

In at least one example, the localization component 420, such as localization component 104, may determine a location, one or more positions, orientations, velocities, and/or accelerations, of the vehicle 402 in relation to a local and/or global map based at least in part on sensor data received from the sensor system(s) 406 and/or map data associated with a map (e.g., of the map(s)). In at least one example, the localization component 420 may include, or be associated with a calibration system that is capable of performing operations for calibrating (determining various intrinsic and extrinsic parameters associated with any one or more of the sensor system(s) 406), localizing, and mapping substantially simultaneously. Additional details associated with the localization component 420 are described above with reference to FIG. 1.

In at least one example, the perception component 422 may perform object detection, segmentation, and/or classification based at least in part on sensor data received from the sensor system(s) 406. In at least one example, the perception component 422 may receive raw sensor data (e.g., from the sensor system(s) 406). In at least one example, the perception component 422 may receive image data and may utilize one or more image processing algorithms to perform object detection, segmentation, and/or classification with respect to object(s) identified in the image data. In some examples, the perception component 422 may associate a bounding box (or otherwise an instance segmentation) with an identified object and may associate a confidence score associated with a classification of the identified object with the identified object. In some examples, objects, when rendered via a display, may be colored based on their perceived class. The perception component 422 may perform similar processes for one or more other modalities.

The prediction component 424 may receive sensor data from the sensor system(s) 406, map data associated with a map (e.g., of the map(s) which may be in storage 430), and/or perception data output from the perception component 422 (e.g., processed sensor data), and may output predictions associated with one or more objects within the environment of the vehicle 402. In at least one example, the planner component 426 may an action for the vehicle 402 to take, as described above, based at least in part on sensor data received from the sensor system(s) 406, map data, and/or any determinations made by the other components of the vehicle 402.

Additional details of localization systems, perception systems, prediction systems, and/or planning systems that are usable can be found in U.S. Pat. No. 9,612,123, issued on Apr. 4, 2017, and U.S. Pat. No. 10,353,390, issued on Jul. 16, 2019, the entire contents of both of which are incorporated by reference herein. In some examples where the vehicle 402 is not an autonomous vehicle, one or more of the aforementioned systems may be omitted from the vehicle 402. While the systems described above are illustrated as "onboard" the vehicle 402, in other implementations, the systems may be remotely located and/or accessible to the vehicle 402. Furthermore, while the systems are described above as "systems," such systems may comprise one or more components for performing operations attributed to each of the systems.

In at least one example, the localization component 420, the perception component 422, the prediction component 424, and/or the planner component 426 may process sensor data, as described above, and may send their respective outputs over network(s) 432, to computing device(s) 434. In at least one example, the localization component 420, the perception component 422, the prediction component 424, and/or the planner component 426 may send their respective outputs to the computing device(s) 434 at a particular frequency, after a lapse of a pre-determined period of time, in near real-time, etc.

In at least one example, the vehicle computing device(s) 404 may include one or more system controllers 428, which can be configured to control steering, propulsion, braking, safety, emitters, communication, and other systems of the vehicle 402. These system controller(s) 428 may communicate with and/or control corresponding systems of the drive system(s) 414 and/or other systems of the vehicle 402.

In at least one example, the sensor system(s) 406 may include lidar sensors, radar sensors, ultrasonic transducers, sonar sensors, location sensors (e.g., GPS, compass, etc.), inertial sensors (e.g., inertial measurement units, accelerometers, magnetometers, gyroscopes, etc.), cameras (e.g., RGB, IR, intensity, depth, etc.), wheel encoders, audio sensors, environment sensors (e.g., temperature sensors, humidity sensors, light sensors, pressure sensors, etc.), ToF sensors, etc. The sensor system(s) 406 may provide input to the vehicle computing device(s) 404. In some examples, the sensor system(s) 406 may preprocess at least some of the sensor data prior to sending the sensor data to the vehicle computing device(s) 404. In at least one example, the sensor system(s) 406 may send sensor data, via the network(s) 432, to the computing device(s) 434 at a particular frequency, after a lapse of a pre-determined period of time, in near real-time, etc.

The vehicle 402 may also include one or more emitters 408 for emitting light and/or sound, as described above. The emitter(s) 408 in this example include interior audio and visual emitters to communicate with passengers of the vehicle 402. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 408 in this example also include exterior emitters. By way of example and not limitation, the exterior emitters in this example include light emitters (e.g., indicator lights, signs, light arrays, etc.) to visually communicate with pedestrians, other drivers, other nearby vehicles, etc., one or more audio emitters (e.g., speakers, speaker arrays, horns, etc.) to audibly communicate with pedestrians, other drivers, other nearby vehicles, etc., etc. In at least one example, the emitter(s) 408 may be positioned at various locations about the exterior and/or interior of the vehicle 402.

The vehicle 402 may also include communication connection(s) 410 that enable communication between the vehicle 402 and other local or remote computing device(s). For instance, the communication connection(s) 410 may facilitate communication with other local computing device(s) on the vehicle 402 and/or the drive system(s) 414. Also, the communication connection(s) 410 may allow the vehicle to communicate with other nearby computing device(s) (e.g., other nearby vehicles, traffic signals, etc.). The communications connection(s) 410 also enable the vehicle 402 to communicate with a remote teleoperations computing device or other remote services.

The communications connection(s) 410 may include physical and/or logical interfaces for connecting the vehicle computing device(s) 404 to another computing device or a network, such as network(s) 432. For example, the communications connection(s) 410 may enable Wi-Fi-based communication such as via frequencies defined by the IEEE 802.11 standards, short range wireless frequencies such as BLUETOOTH®, or any suitable wired or wireless communications protocol that enables the respective computing device to interface with the other computing device(s).

The direct connection 412 may directly connect the drive system(s) 414 and other systems of the vehicle 402.

In at least one example, the vehicle 402 may include drive system(s) 414. In some examples, the vehicle 402 may have a single drive system 414. In at least one example, if the vehicle 402 has multiple drive systems 414, individual drive systems 414 may be positioned on opposite ends of the vehicle 402 (e.g., the front and the rear, etc.). In at least one example, the drive system(s) 414 may include sensor system(s) to detect conditions of the drive system(s) 414 and/or the surroundings of the vehicle 402. By way of example and not limitation, the sensor system(s) may include wheel encoder(s) (e.g., rotary encoders) to sense rotation of the wheels of the drive module, inertial sensors (e.g., inertial measurement units, accelerometers, gyroscopes, magnetometers, etc.) to measure position and acceleration of the drive module, cameras or other image sensors, ultrasonic sensors to acoustically detect objects in the surroundings of the drive module, lidar sensors, radar sensors, etc. Some sensors, such as the wheel encoder(s), can be unique to the drive system(s) 414. In some cases, the sensor system(s) on the drive system(s) 414 may overlap or supplement corresponding systems of the vehicle 402 (e.g., sensor system(s) 406).

The drive system(s) 414 may include many of the vehicle systems, including a high voltage battery, a motor to propel the vehicle 402, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 414 may include a drive module controller which can receive and preprocess data from the sensor system(s) and to control operation of the various vehicle systems. In some examples, the drive module controller may include processor(s) and memory communicatively coupled with the processor(s). The memory may store one or more modules to perform various functionalities of the drive system(s) 414. Furthermore, the drive system(s) 414 also include communication connection(s) that enable communication by the respective drive module with other local or remote computing device(s).

In FIG. 4, the vehicle computing device(s) 404, sensor system(s) 406, emitter(s) 408, and the communication connection(s) 410 are shown onboard the vehicle 402. However, in some examples, the vehicle computing device(s) 404, sensor system(s) 406, emitter(s) 408, and the communication connection(s) 410 may be implemented outside of an actual vehicle (i.e., not onboard the vehicle 402).

As described above, the vehicle 402 may send sensor data to the computing device(s) 434, via the network(s) 432. In some examples, the vehicle 402 may send raw sensor data to the computing device(s) 434. In other examples, the vehicle 402 may send processed sensor data and/or representations of sensor data to the computing device(s) 434 (e.g., data output from the localization component 420, the perception component 422, the prediction component 424, and/or the planner component 426). In some examples, the vehicle 402 may send sensor data to the computing device(s) 434 at a particular frequency, after a lapse of a pre-determined period of time, in near real-time, etc.

The computing device(s) 434 may receive the sensor data (raw or processed) from the vehicle 402 and/or other data collection devices, as well as data from one or more third party sources and/or systems. In at least one example, the computing device(s) 434 may include processor(s) 436 and memory 438 communicatively coupled with the processor(s) 436. In the illustrated example, the memory 438 of the computing device(s) 434 stores a training system 440, a map(s) storage 432 (e.g., storing one or more maps and a historical data storage 444 (e.g., data associated with previous errors). In some examples, one or more of the systems and/or storage repositories can be associated with the vehicle 402 or other computing device(s) associated with the system 400 instead of, or in addition to, being associated with the memory 438 of the computing device(s) 434.

In at least one example, the training system 440 can train data model(s), which can be used for various operations as described herein. For example, machine learning algorithms for training machine learned model(s) can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), example-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes. Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network. Radial Basis Function Network (RBFN)), deep learning algorithms (e.g., Deep Boltzmann Machine (DBM), other Deep Belief Networks (DBN), Artificial Neural Network (ANN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA). Flexible Discriminant Analysis (FDA)), SVM (support vector machine), supervised learning, unsupervised learning, semi-supervised learning, etc. The resulting data model(s) can be stored in the memory 438 and/or the storage 430 on the vehicle 402 and can be accessed by in near real-time by one or more components of the vehicle computing device(s) 404.

The processor(s) 416 of the vehicle 402 and the processor(s) 436 of the computing device(s) 434 may be any suitable processor capable of executing instructions to process data and perform operations as described herein. By way of example and not limitation, the processor(s) 416 and 436 may comprise one or more Central Processing Units (CPUs), Graphics Processing Units (GPUs), or any other device or portion of a device that processes electronic data to transform that electronic data into other electronic data that can be stored in registers and/or memory, in some examples, integrated circuits (e.g., ASICs, etc.), gate arrays (e.g., FPGAs, etc.), and other hardware devices can also be considered processors in so far as they are configured to implement encoded instructions.

Memory 418 and 438 are examples of non-transitory computer-readable media. Memory 418 and 438 may store an operating system and one or more software applications, instructions, programs, and/or data to implement the methods described herein and the functions attributed to the various systems. In various implementations, the memory may be implemented using any suitable memory technology, such as static random receive memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 4 is illustrated as a distributed system, in some examples, systems of the vehicle 402 may be associated with the computing device(s) 434 and/or the systems of the computing device(s) 434 may be associated with the vehicle 402. That is, the vehicle 402 may perform one or more of the functions associated with the computing device(s) 434, and vice versa.

Figure 5:
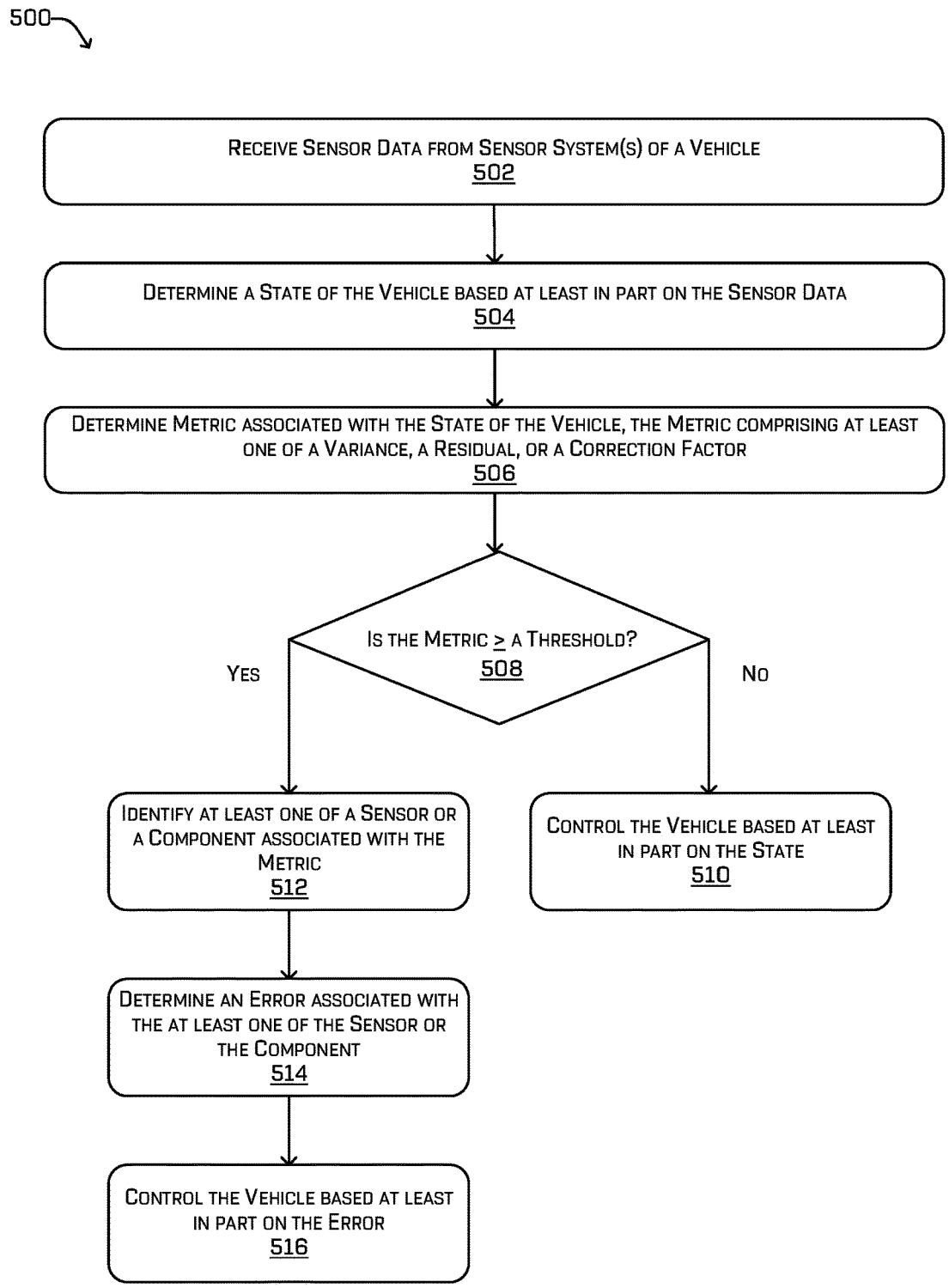
FIG. 5 illustrates an example process for controlling a vehicle based a metric associated with a state of the vehicle, as described herein.
Figure 6:
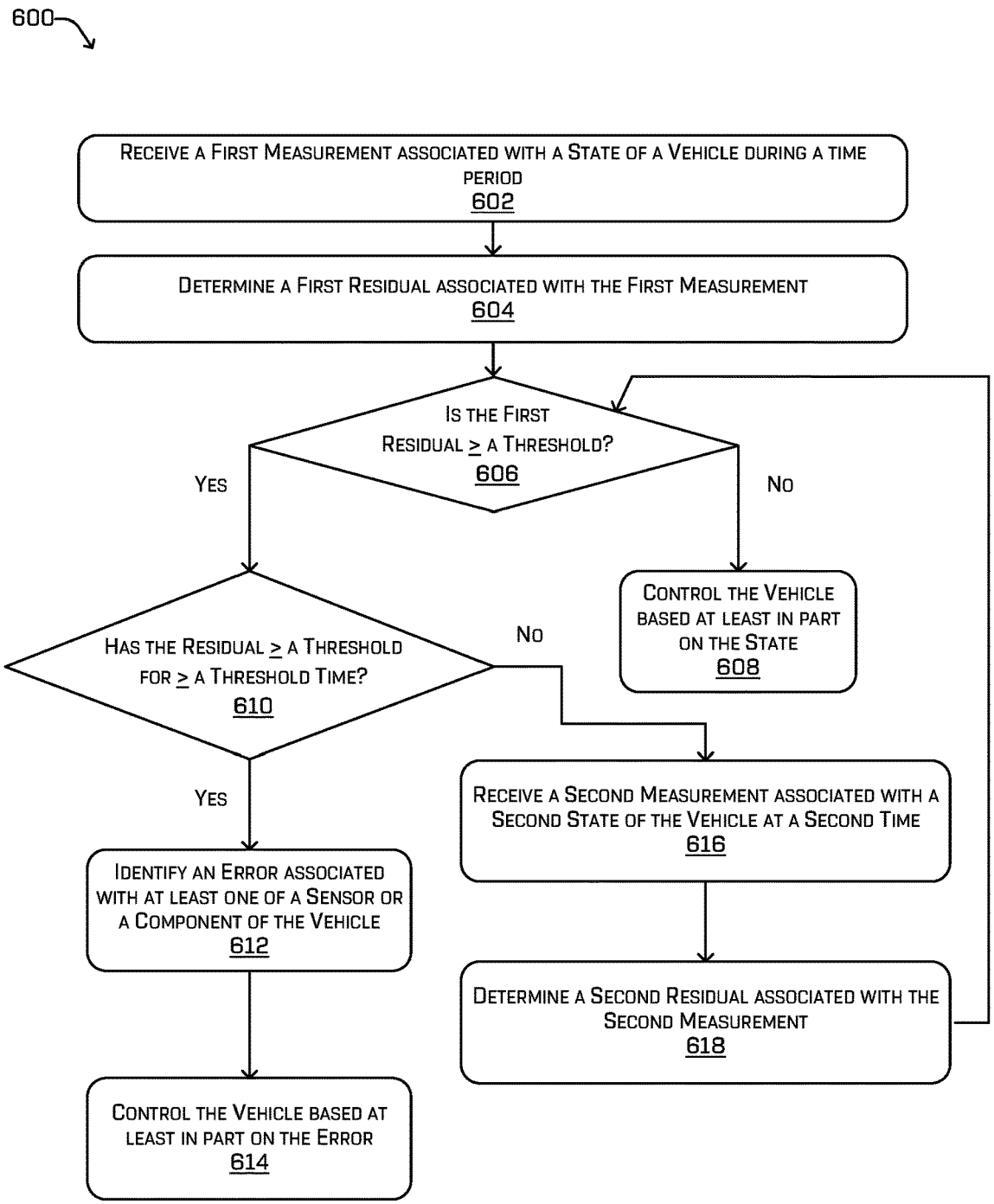
FIG. 6 illustrates an example process for controlling a vehicle based on a residual value associated with a state of the vehicle, as described herein.

FIGS. 2, 5, and 6 illustrate example processes in accordance with embodiments of the disclosure. These processes are illustrated as logical flow graphs, each operation of which represents a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes. Further, operations may be omitted or added while remaining within the scope of this disclosure.

FIG. 5 illustrates an example process 500 for controlling a vehicle based a metric associated with a state of the vehicle, as described herein. Some or all of the process 500 may be performed by one or more components in FIG. 4, as described herein. For example, some or all of the process 500 may be performed by the vehicle computing device(s) 404 and/or computing device(s) 434.

At operation 502, the process may include receiving sensor data from one or more sensor systems of a vehicle. The sensor data may include data captured by lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, lateral velocity sensor (e.g., sensor that determines lateral speed based on ground tracking), etc.), cameras (e.g., red, green blue (RGB), infrared (IR), intensity, depth, etc.), wheel encoders, environment sensors (e.g., temperature sensors, humidity sensors, light sensors, pressure sensors, etc.), time-of-flight (ToF) sensors, etc.

In some examples, the process may additionally include receiving map data from one or more maps stored on a vehicle and/or on a remote computing device. As discussed above, a map may be any number of data structures that are capable of providing information about an environment, such as, but not limited to, topologies (such as junctions, lanes, merging zones, etc.), streets, mountain ranges, roads, terrain, and the environment in general. In some examples, the map(s) may include tile maps, feature maps, and/or other types of maps, such as those described in the U.S. patent applications described above.

At operation 504, the process may include determining a state of the vehicle based at least in part on the sensor data. The state of the vehicle may include a location, a position, orientation, velocity, and/or acceleration of the vehicle at a given time. The state of the vehicle may include an optimized state of the vehicle based on raw and/or processed sensor data. In some examples, the optimized state of the vehicle may be determined based on input from one or more IMUs and/or one or more localizers, such as IMU 112 and/or localizers 114, 116, 118, and/or 120. Such an optimization may comprise, for example, a non-linear least squares optimization (though any other optimization mechanism is contemplated) to minimize any one or more of the residuals defined with respect to the individual components described herein. In some examples, the state of the vehicle may be represented based on one or more degrees of freedom (e.g., 12 degrees of freedom, 15 degrees of freedom). In some examples, the state may include one or more locations (e.g., x-, y-, and/or z-locations), one or more positions and/or orientations (e.g., pitch, roll, yaw, rates associated therewith), one or more velocities (e.g., x-, y-, z-velocities), accelerations (e.g., x-, y-, z-accelerations), or the like. In some examples, the state may be represented across two or more dimensions.

At operation 506, the process may include determining a metric associated with the state of the vehicle, the metric comprising at least one of a variance, a residual, or a correction factor. A variance associated with a state may represent a confidence that the estimated state is accurate. In some examples, the variances may be determined based on a linearized system. In some examples, the variance may include a covariance associated with an estimated state of the vehicle. In such examples, a value associated with the variance may represent a confidence in the state across two or more dimensions.

A residual may represent a difference between an observed measurement (value) (e.g., based on sensor input) and an estimated measurement (value) of a quantity of interest (e.g., estimated pitch, roll, yaw, location in a coordinate system and/or dimension, velocity, etc.). In some examples, the estimated measurement may be based in part on a value associated with a previous time step (e.g., value associated with a measurement taken 0.06 seconds prior to the current measurement). In such examples, the residual may represent inconsistencies in the measurements. A correction factor may include values used to correct for input errors. In some examples, the input errors may include those known to follow a predefined model. Correction factors may include, but are not limited to IMU biases, wheel diameter scale factors, and the like.

At operation 508, the process may include determining whether the metric meets or exceeds a threshold. In some examples, the threshold may be determined based on the metric. In some examples, the threshold may be determined based on a sensor associated therewith. In some examples, the threshold may be determined based on a localizer associated with the metric. In various examples, the threshold may be determined based on an alert limit associated with a monitored state. In some examples, the threshold may be based on one or more environmental considerations.

In some examples, a determination of whether the metric meets or exceeds a threshold may be based on determining that the metric is above the threshold for a threshold period of time (e.g., 0.5 seconds, 1 second, 2 seconds). In such examples, an error determination may be based on a prolonged determination of erroneous measurements. In some examples, the metric may include a maximum and a minimum value. In such examples, the metric meeting or exceeding the threshold may include determining at least one of the metric meets or exceeds a maximum value or meets or is less than a minimum value. In some examples, the maximum and minimum values may represent a percentage of acceptable modification of a component during vehicle operation. For example, due to temperatures in an operating environment, wheel radii may increase and/or decrease during operation. The vehicle computing system may apply a correction factor to a changing radius of a vehicle. However, the correction factor may be limited to correct a maximum of a 0.75% increase (e.g., maximum) and 0.75% decrease (e.g., minimum) in the radius of the wheel.

Based on a determination that the metric is below the threshold ("No" at operation 508), the process may include, at operation 510, controlling the vehicle based at least in part on the state. In some examples, vehicle control may include maintaining a trajectory associated with the vehicle. In some examples, the vehicle control may include modifying the trajectory, such as based on other (non-state-based) determinations (e.g., stopping at a stop sign or a red light, yielding for a pedestrian, etc.).

Based on a determination that the metric meets or exceeds the threshold ("Yes" at operation 508), the process may include, at operation 512, identifying at least one of a sensor or a component associated with the metric. In various examples, the threshold exceedance may provide an indication of an error associated with the at least one of the sensor or the component.

At operation 514, the process may include determining an error associated with the at least one of the sensor or the component. In some examples, the vehicle computing system may determine an extent of the error (e.g., large error, small error, etc.). In various examples, the extent of the error may be based on an amount the metric exceeds the threshold.

At operation 516, the process may include controlling the vehicle based at least in part on the error. Controlling the vehicle based on the error may include stopping the vehicle, slowing down to a pre-determined speed, and/or slowing down a pre-determined amount (e.g., slowing to 50% of the speed, decreasing forward speed by 10 miles per hour, etc.), or the like. In some examples, a determination of an action to take may be based on the extent of the error, a number of redundant systems available, importance of the associated sensor and/or component to the vehicle control, and the like.

FIG. 6 illustrates an example process 600 for controlling a vehicle based on a residual value associated with a state of the vehicle, as described herein. Some or all of the process 600 may be performed by one or more components in FIG. 4, as described herein. For example, some or all of the process 600 may be performed by the vehicle computing device(s) 404 and/or computing device(s) 434.

At operation 602, the process may include receiving a first measurement associated with a state of a vehicle during a first period of time. In some examples, the first measurement may include an average associated with measurements taken over the first period of time. In some examples, the vehicle computing device may apply an auto aggressive moving average filter on measurements captured by sensors and/or determined by components of the vehicle, such as an IMU, a localizer, or the like. For example, the first measurement may be determined utilizing a function, such as an auto regressive moving average (ARMA) filter.

In some examples, the first measurement may be associated with a first time. The measurement may be determined based on sensor data received from one or more sensors of the vehicle. In some examples, the state of the vehicle may include a location, a position, orientation, velocity, and/or acceleration of the vehicle at a given time. In some examples, the state of the vehicle may be represented based on one or more degrees of freedom (e.g., 12 degrees of freedom, 15 degrees of freedom). In some examples, the state may include one or more locations (e.g., x-, y-, and/or z-locations), one or more positions and/or orientations (e.g., pitch, roll, yaw, rates associated therewith), one or more velocities (e.g., x-, v-, z-velocities), accelerations (e.g., x-, y-, z-accelerations), or the like. In some examples, the state may be represented across two or more dimensions.

At operation 604, the process may include determining a first residual associated with the first measurement. The residual may represent a difference between an observed measurement (e.g., based on sensor input) and an estimated measurement of a quantity of interest (e.g., estimated pitch, roll, yaw, location in a coordinate system and/or dimension, velocity, etc.). In some examples, the estimated measurement may be based in part on a value associated with a previous time step (e.g., value associated with a measurement taken 0.06 seconds prior to the current measurement). In such examples, the residual may represent inconsistencies in the measurements over time.

In some examples, the vehicle computing system may compare the first residual to a variance associated with the state at the first time, such as by normalizing the residual based on the variance. In such examples, the comparison may result in a whitened residual. In various examples, the first residual may include a value associated with the white in the whitened residual.

At operation 606, the process may include determining whether the first residual meets or exceeds a threshold. In some examples, the threshold may be determined based on a sensor and/or component associated therewith. In some examples, the threshold may be determined based on a localizer associated with the first residual. In some examples, the threshold may be based on one or more environmental considerations.

Based on a determination that the first residual is less than the threshold ("No" at operation 606), the process may include, at operation 608, controlling the vehicle based at least in part on the state. In some examples, vehicle control may include maintaining a trajectory associated with the vehicle. In some examples, the vehicle control may include modifying the trajectory, such as based on other (non-state-based) determinations (e.g., stopping at a stop sign or a red light, yielding for a pedestrian, etc.

Based on a determination that the first residual meets or exceeds the threshold ("Yes" at operation 606), the process may include, at operation 610, determining whether the first residual has remained at or above the threshold for at or more than a threshold amount of time. The threshold amount of time may be determined based on the sensor, component, and/or localizes associated therewith. In some examples, the threshold amount of time may be based on a velocity associated with the vehicle, an operating environment (e.g., freeway, business district, etc.), environmental considerations, weather conditions, (e.g., rain, snow, ice detected, etc.), traffic density, and the like.

Based on a determination that the first residual has been at or above the threshold for the threshold amount of time ("Yes" at operation 610), the process may include, at operation 612, identifying an error associated with at least one of a sensor or a component of the vehicle. In some examples, the vehicle computing system may determine an extent of the error, such as based on the extent of the threshold exceedance.

At operation 614, the process may include controlling the vehicle based at least in part on the error. Controlling the vehicle based on the error may include stopping the vehicle, slowing down to a pre-determined speed, and/or slowing down a pre-determined amount (e.g., slowing to 50% of the speed, decreasing forward speed by 10 miles per hour, etc.), or the like. In some examples, a determination of an action to take may be based on the extent of the error, a number of redundant systems available, importance of the associated sensor and/or component to the vehicle control, and the like.

Based on a determination that the first residual meets or exceeds the threshold for the threshold period of time ("No" at operation 610), the process may include, at operation 616, receiving a second measurement associated with a second state of the vehicle at a second time. The second measurement may be associated with a same localizer, sensor, and/or component as the first measurement.

At operation 618, the process may include determining a second residual associated with the second measurement. The second residual may represent a difference between an observed measurement at the second time and an estimated measurement of a quantity of interest (e.g., estimated pitch, roll, yaw, location in a coordinate system and/or dimension, velocity, etc.). In some examples, the estimated measurement may be based in part on a value associated with the first time or another previous time step. In various examples, the vehicle computing system may determine, at operation 606, whether the second residual meets or exceeds the threshold value.

Figure 7:
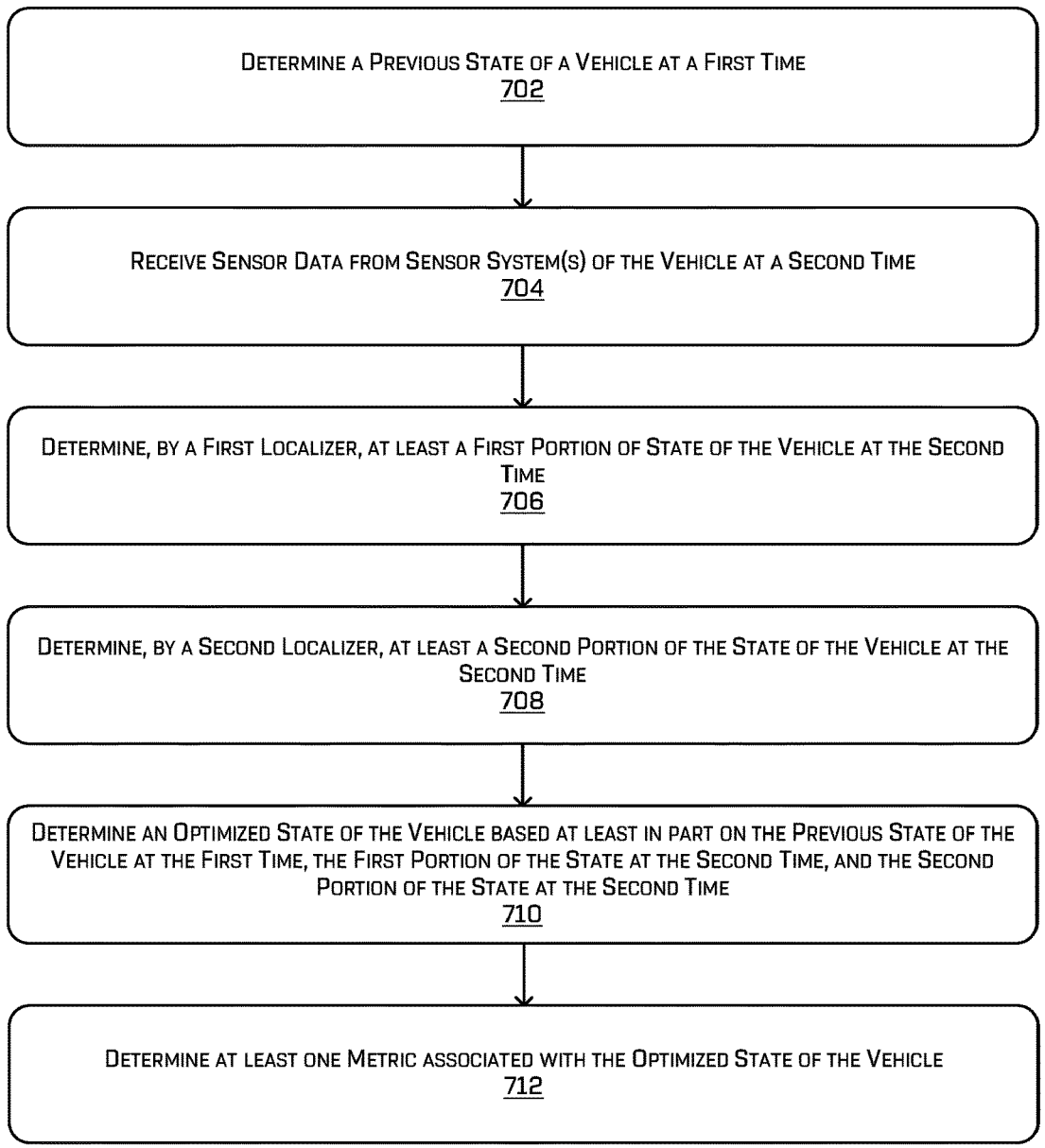
FIG. 7 illustrates an example process for determining an optimized state of a vehicle, as described herein.

FIG. 7 illustrates an example process 700 for determining an optimized state of the vehicle, as described herein. Some or all of the process 700 may be performed by one or more components in FIG. 4, as described herein. For example, some or all of the process 700 may be performed by the vehicle computing device(s) 404 and/or computing device(s) 434.

At operation 702, the process may include determining a previous state of a vehicle at a first time. The previous state of the vehicle may include a global state of the vehicle and/or a portion of a state of the vehicle at the first time (e.g., a previous time step).

At operation 704, the process may include receiving sensor data from one or more sensor systems of the vehicle at a second time (after the first time). The sensor data may include data captured by one or more sensors, as described above. The process may additionally include receiving map data, as described above.

At operation 706, the process may include determining, by a first localizer (or IMU), at least a first portion of a state of the vehicle at the second time (or otherwise some intermediate variable for determining at least a portion of a final state). The first portion of the state of the vehicle may include at least one of a location, a position, orientation, velocity, and/or acceleration of the vehicle at the second time, as determined by the first localizer. In some examples, the first portion of the state of the vehicle may be represented across two or more dimensions.

At operation 708, the process may include determining, by a second localizer (or IMU), at least a second portion of the state of the vehicle at the second time (or, as above, some intermediate variable). The second portion of the state of the vehicle may include at least one of a location, a position, orientation, velocity, and/or acceleration of the vehicle at the second time, as determined by the second localizer. In some examples, the second portion of the state of the vehicle may be represented across two or more dimensions.

In either operation 706 and/or 708, residuals may be determined with respect to the one or more localizers.

At operation 710, the process may include determining an optimized state of the vehicle based at least in part on the previous state of the vehicle at the first time, the first portion of the state of the vehicle at the second time, and/or the second portion of the state of the vehicle at the second time.

At operation 712, the process may include determining at least one metric associated with the optimized state of the vehicle. The at least one metric may include a variance (or covariance), residual, or a value associated with a correction factor, as described herein.

EXAMPLE CLAUSES

A: A system comprising: one or more processors; and one or more non-transitory computer-readable media that, when executed by the one or more processors, causes the system to perform operations comprising: receiving sensor data from a sensor of an autonomous vehicle; determining, based at least in part on the sensor data, a state of the autonomous vehicle comprising at least one of a location, a position, an orientation, a velocity, or an acceleration of the autonomous vehicle; determining a metric associated with the state of the autonomous vehicle, wherein the metric comprises at least two of a variance, a residual, or a correction factor; determining that the metric meets or exceeds a metric threshold; determining an error in the state of the autonomous vehicle based at least in part on the metric meeting or exceeding the metric threshold; and controlling the autonomous vehicle based at least in part on the error.

B: The system as paragraph A describes, wherein the operations further comprise: determining at least one of a sensor or a component of the vehicle associated with the metric; determining a weight value associated with the at least one of the sensor or the component, wherein the weight value is based at least in part on the at least one of the sensor or the component to control of the vehicle; and applying the weight value to the metric to determine a weighted metric, wherein determining that the metric meets or exceeds the threshold comprises determining that the weighted metric meets or exceeds the threshold.

C: The system as either paragraph A or paragraph B describes, wherein the metric comprises the residual and the variance, and wherein determining the metric meets or exceeds the threshold value comprises: determining an updated metric based at least in part on the residual and the variance; and determining the updated metric meets or exceeds the threshold value.

D: The system as any one of paragraphs A-C describe, wherein the metric is a first metric comprising a first residual associated with the state of the autonomous vehicle, the operations further comprising: determining a second metric comprising a second residual associated with the state of the autonomous vehicle, wherein determining that the metric meets or exceeds the metric threshold comprises determining that a sum of first metric and the second metric meets or exceeds the metric threshold.

E: The system as any one of paragraphs A-D describe, wherein the metric is a first metric associated with a first time, the operations further comprising: determining a second metric associated with a second time; determining that the second metric exceeds the metric threshold; and determining that a time between the first time and the second time meets or exceeds a threshold time, wherein determining the error is based at least in part on the time meeting or exceeding the threshold time.

F: A method comprising: receiving sensor data from a sensor of a vehicle; determining, based at least in part on the sensor data, a state of the vehicle associated with at least one of a location, a position, an orientation, a velocity, or an acceleration of the vehicle; determining a metric associated with the state of the autonomous vehicle, wherein the metric comprises at least two of a variance, a residual, or a correction factor; determining that the metric meets or exceeds a threshold; and determining an error in the state of the vehicle based at least in part on the metric meeting or exceeding the threshold.

G: The method as paragraph F describes, further comprising controlling the vehicle based at least in part on the error, wherein controlling the vehicle comprises at least one of: stopping the vehicle; reducing a velocity of the vehicle; limiting an acceleration of the vehicle; or limiting a steering angle of the vehicle.

H: The method as either paragraph F or paragraph G describes, wherein the at least two of the variance, the residual or the correction factor are based at least in part on: a global state of the vehicle; a portion of the state of the vehicle; raw sensor data; or processed sensor data.

I: The method as any one of paragraphs F-H describe, wherein the metric comprises the residual associated with the state of the vehicle, the method further comprising: determining that the metric has exceeded the threshold for at least a threshold time, wherein determining the error is based at least in part on the metric exceeding the threshold for the at least the threshold time.

J: The method as any one of paragraphs F-I describe, wherein the metric is a first metric associated with a first component of the vehicle, the method further comprising: determining a second metric associated with a second component of the vehicle, wherein the first component and the second component are a same or similar type of component; and determining a difference between the first metric to the second metric meets or exceeds a threshold difference, wherein determining the error is based at least in part on the difference meeting or exceeding the threshold difference.

K: The method as any one of paragraphs F-J describe, wherein the metric is a first metric comprising a first residual associated with the state of the vehicle, the method further comprising: determining a second metric comprising a second residual associated with the state of the vehicle, wherein determining that the metric meets or exceeds the threshold comprises determining that a sum of first metric and the second metric meets or exceeds the threshold.

L: The method as any one of paragraphs F-K describe, wherein the metric comprises the residual and the variance, and wherein determining the metric meets or exceeds the threshold value comprises: determining an updated metric based at least in part on the residual and the variance; and determining the updated metric meets or exceeds the threshold value.

M: The method as any one of paragraphs F-L describe, further comprising: determining at least one of a sensor or a component of the vehicle associated with the metric; determining a weight value associated with the at least one of the sensor or the component, wherein the weight value is based at least in part on the at least one of the sensor or the component to control of the vehicle; and applying the weight value to the metric to determine a weighted metric, wherein determining that the metric meets or exceeds the threshold comprises determining that the weighted metric meets or exceeds the threshold.

N: The method as any one of paragraphs F-M describe, further comprising: determining a first sensor or a first component of the vehicle associated with the metric; identifying a second sensor or a second component of the vehicle; determining a second metric associated with the second sensor or the second component; determining that the second metric is less than the threshold; and controlling the vehicle based at least in part on the second sensor or the second component.

O: The method as any one of paragraphs F-N describe, further comprising: determining at least one of a sensor or a component of the vehicle associated with the metric; determining a weight value associated with the at least one of the sensor or the component, wherein the weight value is based at least in part on the at least one of the sensor or the component to control of the vehicle; and applying the weight value to the metric to determine a weighted metric, wherein determining that the metric meets or exceeds the threshold comprises determining that the weighted metric meets or exceeds the threshold.

P: A system or device comprising: a processor; and a non-transitory computer-readable medium storing instructions that, when executed, cause a processor to perform a computer-implemented method as any one of paragraphs F-O describe.

Q: A system or device comprising: a means for processing; and a means for storing coupled to the means for processing, the means for storing including instructions to configure one or more devices to perform a computer-implemented method as any one of paragraphs F-O describe.

R: One or more non-transitory computer-readable media comprising instructions that when executed by one or more processors cause the one or more processors to perform operations comprising: receiving sensor data from a sensor of a vehicle; determining, based at least in part on the sensor data, a state of the vehicle associated with at least one of a location, a position, an orientation, a velocity, or an acceleration of the vehicle; determining a metric associated with the state of the autonomous vehicle, wherein the metric comprises at least two of a variance, a residual, or a correction factor; determining that the metric meets or exceed a threshold; and determining an error in the state of the vehicle based at least in pail on the metrics meeting or exceeding the threshold.

S: The one or more non-transitory computer-readable media as paragraph R recites, wherein the operations further comprise: determining at least one of a sensor or a component of the vehicle associated with the metric; determining a weight value associated with the at least one of the sensor or the component, wherein the weight value is based at least in part on the at least one of the sensor or the component to control of the vehicle; and applying the weight value to the metric to determine a weighted metric, wherein determining that the metric meets or exceeds the threshold comprises determining that the weighted metric meets or exceeds the threshold.

T: The one or more non-transitory computer-readable media as paragraph S recites, wherein the weight value is determined based at least in part on at least one of: a road condition associated with a road corresponding to operation of the vehicle; a time of day; a light level; a temperature; or precipitation.

U: The one or more non-transitory computer-readable media as any one of paragraphs R-T describe, wherein the metric comprises the residual and the variance, and wherein determining the metric meets or exceeds the threshold value comprises: determining an updated metric based at least in part on the residual and the variance; and determining the updated metric meets or exceeds the threshold value.

V: The one or more non-transitory computer-readable media as any one of paragraphs R-U describe, the operations further comprising: determining a first sensor or a first component of the vehicle associated with the metric; identifying a second sensor or a second component of the vehicle; determining a second metric associated with the second sensor or the second component; determining that the second metric is less than the threshold; and controlling the vehicle based at least in part on the second sensor or the second component.

W: A vehicle comprising: a processor; and a non-transitory computer-readable medium as any one of paragraphs R-V describe coupled to the processor.

X: A system comprising: a processor; and a non-transitory computer-readable medium as any one of paragraphs R-V describe coupled to the processor.

While the example clauses described above are described with respect to one particular implementation, it should be understood that, in the context of this document, the content of the example clauses can also be implemented via a method, device, system, a computer-readable medium, and/or another implementation. Additionally, any of examples A-X may be implemented alone or in combination with any other one or more of the examples A-X.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
   one or more processors; and
   one or more non-transitory computer-readable media that, when executed by the one or more processors, causes the system to perform operations comprising:
   receiving sensor data from a sensor of an autonomous vehicle;
   determining, based at least in part on the sensor data, a state of the autonomous vehicle comprising at least one of a location, a position, an orientation, a velocity, or an acceleration of the autonomous vehicle;
   determining, based at least in part on the sensor data, a metric associated with the state of the autonomous vehicle, wherein the metric comprises at least two of a variance, a residual, or a correction factor;
determining that the metric meets or exceeds a metric threshold;
determining an error in the state of the autonomous vehicle based at least in part on the metric meeting or exceeding the metric threshold; and
controlling the autonomous vehicle based at least in part on the error.

2. The system as claim 1 recites, wherein the operations further comprise:
determining at least one of a sensor or a component of the autonomous vehicle associated with the metric;
determining a weight value associated with the at least one of the sensor or the component, wherein the weight value is based at least in part on the at least one of the sensor or the component to control of the autonomous vehicle; and
applying the weight value to the metric to determine a weighted metric,
wherein determining that the metric meets or exceeds the metric threshold comprises determining that the weighted metric meets or exceeds the metric threshold.

3. The system as claim 1 recites, wherein the metric comprises the residual and the variance, and
wherein determining the metric meets or exceeds the metric threshold comprises:
determining an updated metric based at least in part on the residual and the variance; and
determining the updated metric meets or exceeds the metric threshold.

4. The system as claim 1 recites, wherein the metric is a first metric comprising a first residual associated with the state of the autonomous vehicle, the operations further comprising:
determining a second metric comprising a second residual associated with the state of the autonomous vehicle,
wherein determining that the metric meets or exceeds the metric threshold comprises determining that a sum of first metric and the second metric meets or exceeds the metric threshold.

5. The system as claim 1 recites, wherein the metric is a first metric associated with a first time, the operations further comprising:
determining a second metric associated with a second time;
determining that the second metric exceeds the metric threshold; and
determining that a time between the first time and the second time meets or exceeds a threshold time,
wherein determining the error is based at least in part on the time meeting or exceeding the threshold time.

6. A method comprising:
receiving sensor data from a sensor of a vehicle;
determining, based at least in part on the sensor data, a state of the vehicle associated with at least one of a location, a position, an orientation, a velocity, or an acceleration of the vehicle;
determining, based at least in part on the sensor data, a metric associated with the state of the vehicle, wherein the metric comprises at least two of a variance, a residual, or a correction factor;
determining that the metric meets or exceeds a threshold; and
determining an error in the state of the vehicle based at least in part on the metric meeting or exceeding the threshold.

7. The method as claim 6 recites, further comprising controlling the vehicle based at least in part on the error, wherein controlling the vehicle comprises at least one of:
stopping the vehicle;
reducing a velocity of the vehicle;
limiting an acceleration of the vehicle; or
limiting a steering angle of the vehicle.

8. The method as claim 6 recites, wherein the at least two of the variance, the residual or the correction factor are based at least in part on:
a global state of the vehicle;
a portion of the state of the vehicle;
raw sensor data; or
processed sensor data.

9. The method as claim 6 recites, wherein the metric comprises the residual associated with the state of the vehicle, the method further comprising:
determining that the metric has exceeded the threshold for at least a threshold time,
wherein determining the error is based at least in part on the metric exceeding the threshold for the at least the threshold time.

10. The method as claim 6 recites, wherein the metric is a first metric associated with a first component of the vehicle, the method further comprising:
determining a second metric associated with a second component of the vehicle, wherein the first component and the second component are a same or similar type of component; and
determining a difference between the first metric to the second metric meets or exceeds a threshold difference,
wherein determining the error is based at least in part on the difference meeting or exceeding the threshold difference.

11. The method as claim 6 recites, wherein the metric is a first metric comprising a first residual associated with the state of the vehicle, the method further comprising:
determining a second metric comprising a second residual associated with the state of the vehicle,
wherein determining that the metric meets or exceeds the threshold comprises determining that a sum of first metric and the second metric meets or exceeds the threshold.

12. The method as claim 6 recites, wherein the metric comprises the residual and the variance, and wherein determining the metric meets or exceeds the threshold comprises:
determining an updated metric based at least in part on the residual and the variance; and
determining the updated metric meets or exceeds the threshold.

13. The method as claim 6 recites, further comprising:
determining at least one of a sensor or a component of the vehicle associated with the metric;
determining a weight value associated with the at least one of the sensor or the component, wherein the weight value is based at least in part on the at least one of the sensor or the component to control of the vehicle; and
applying the weight value to the metric to determine a weighted metric,
wherein determining that the metric meets or exceeds the threshold comprises determining that the weighted metric meets or exceeds the threshold.

14. The method as claim 6 recites, further comprising:
determining a first sensor or a first component of the vehicle associated with the metric;
identifying a second sensor or a second component of the vehicle;

determining a second metric associated with the second sensor or the second component;

determining that the second metric is less than the threshold; and controlling the vehicle based at least in part on the second sensor or the second component.

15. One or more non-transitory computer-readable media comprising instructions that when executed by one or more processors cause the one or more processors to perform operations comprising:

receiving sensor data from a sensor of a vehicle;

determining, based at least in part on the sensor data, a state of the vehicle associated with at least one of a location, a position, an orientation, a velocity, or an acceleration of the vehicle;

determining a metric associated with the state of the vehicle, that is determined based at least in part on the sensor data, wherein the metric comprises at least two of a variance, a residual, or a correction factor;

determining that the metric meets or exceed a threshold; and determining an error in the state of the vehicle based at least in part on the metric meeting or exceeding the threshold.

16. The one or more non-transitory computer-readable media as claim 15 recites, wherein the operations further comprise:

determining at least one of a sensor or a component of the vehicle associated with the metric;

determining a weight value associated with the at least one of the sensor or the component, wherein the weight value is based at least in part on the at least one of the sensor or the component to control of the vehicle; and applying the weight value to the metric to determine a weighted metric, wherein determining that the metric meets or exceeds the threshold comprises determining that the weighted metric meets or exceeds the threshold.

17. The one or more non-transitory computer-readable media as claim 16 recites, wherein the weight value is determined based at least in part on at least one of:

a road condition associated with a road corresponding to operation of the vehicle;

a time of day;

a light level;

a temperature; or precipitation.

18. The one or more non-transitory computer-readable media as claim 15 recites, wherein the metric comprises the residual and the variance, and wherein determining the metric meets or exceeds the threshold comprises:

determining an updated metric based at least in part on the residual and the variance; and determining the updated metric meets or exceeds the threshold.

19. The one or more non-transitory computer-readable media as claim 15 recites, the operations further comprising:

determining a first sensor or a first component of the vehicle associated with the metric;

identifying a second sensor or a second component of the vehicle;

determining a second metric associated with the second sensor or the second component;

determining that the second metric is less than the threshold; and controlling the vehicle based at least in part on the second sensor or the second component.

20. The one or more non-transitory computer-readable media as claim 15 recites, wherein the metric comprises the residual associated with the state of the vehicle, the operations further comprising:

determining that the metric has exceeded the threshold for at least a threshold time, wherein determining the error is based at least in part on the metric exceeding the threshold for the at least the threshold time.

* * * * *